United States Patent
Thompson et al.

(10) Patent No.: US 6,675,151 B1
(45) Date of Patent: *Jan. 6, 2004

(54) SYSTEM AND METHOD FOR PERFORMING SUBSTITUTE FULFILLMENT INFORMATION COMPILATION AND NOTIFICATION

(75) Inventors: Roland R. Thompson, Malvern, PA (US); Michael S. Blackstone, Downingtown, PA (US)

(73) Assignee: Frontline Data, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/419,266

(22) Filed: Oct. 15, 1999

Related U.S. Application Data

(63) Continuation-in-part of application No. 09/217,116, filed on Dec. 21, 1998, now Pat. No. 6,334,133.

(51) Int. Cl.[7] ............................................. G06F 17/60
(52) U.S. Cl. ........................................................ 705/9
(58) Field of Search ............................................. 705/9

(56) References Cited

U.S. PATENT DOCUMENTS

| | | | |
|---|---|---|---|
| 3,686,482 A | | 8/1972 | Gelder |
| 4,937,743 A | * | 6/1990 | Rassman et al. ............... 705/8 |
| 5,111,391 A | * | 5/1992 | Fields et al. .................... 705/9 |
| 5,113,430 A | * | 5/1992 | Richardson, Jr. et al. ... 370/400 |
| 5,117,353 A | * | 5/1992 | Stipanovich et al. ......... 705/11 |
| 5,164,897 A | | 11/1992 | Clark et al. |

(List continued on next page.)

FOREIGN PATENT DOCUMENTS

| | | | | |
|---|---|---|---|---|
| JP | 10003492 A | * | 1/1998 | ........... G06F/17/60 |

OTHER PUBLICATIONS

"Automated Substitute Finder System," Fall 1994 [retrieved from the Internet on Aug. 23, 2002]. URL: http://www.cs-ba.org/ssd/samples/Technology/automated.htm.*

Haddad, Anne. "Computer calls for substitutes," The Sun, Dec. 15, 1994.*

Stepp, Diane. "School watch The daily hunt for substitute teachers," The Atlanta Journal the Atlanta Constitution, Apr. 9, 1998.*

(List continued on next page.)

*Primary Examiner*—Tariq R. Hafiz
(74) *Attorney, Agent, or Firm*—Thomas A. Corrado; Kilpatrick Stockton LLP

(57) ABSTRACT

A system and method for automating the performance of substitute fulfillment to assign a replacement worker to substitute for a worker during a temporary absence, performing placement of floating workers, tracking absences and entitlements of workers, notifying interested parties regarding unexpected events and daily announcements, and bidding for temporary workers. Substitute fulfillment, contact, absence, entitlement and notification data is stored centrally in a database on a server at a common site for multiple organizations employing the substitute fulfillment or notification system. When a worker absence is indicated, the system searches the database to obtain a list of potential replacements for the absent worker and tracks the worker's absences and entitlements. The system contacts potential replacements until one is found or until the list is exhausted. The system generates suitable reports and notifies organization personnel of any activity. The system also records announcements regarding unexpected or current events and contacts the interested parties of an organization with these announcements. The system stores and aggregates historical operation data, prepares reports and provides relevant services.

13 Claims, 26 Drawing Sheets

U.S. PATENT DOCUMENTS

| | | | | |
|---|---|---|---|---|
| 5,255,305 A | * | 10/1993 | Sattar | 379/32.01 |
| 5,325,292 A | | 6/1994 | Crockett | |
| 5,369,570 A | * | 11/1994 | Parad | 705/8 |
| 5,416,694 A | | 5/1995 | Parrish et al. | |
| 5,548,506 A | * | 8/1996 | Srinivasan | 700/8 |
| 5,634,055 A | | 5/1997 | Barnewall et al. | |
| 5,832,497 A | * | 11/1998 | Taylor | 707/104 |
| 5,884,270 A | | 3/1999 | Walker et al. | |
| 5,911,134 A | * | 6/1999 | Castonguay et al. | 705/9 |
| 5,913,029 A | | 6/1999 | Shostak | |
| 5,913,201 A | * | 6/1999 | Kocur | 705/9 |
| 5,918,207 A | | 6/1999 | McGovern et al. | |
| 5,974,392 A | | 10/1999 | Endo | |
| 6,044,354 A | | 3/2000 | Asplen, Jr. | |
| 6,044,355 A | | 3/2000 | Crockett et al. | |
| 6,049,776 A | * | 4/2000 | Donnelly et al. | 705/8 |
| 6,058,423 A | | 5/2000 | Factor | |

OTHER PUBLICATIONS

"Myriad locations, student populations no longer hinder substitute management system," The Journal, Nov. 1993.*

Willis, William. "Telephony products enhance convenience, communication & distance learning," The Journal v23 n7 p12(4), Feb. 1996.*

Gellermen, Elizabeth. "Telephone technology increases communication across the board," The Journal v21 n10 p14(4), May 1994.*

Baca, Aaron. "Throwing out the sub routine now computers, not secretaries, can find substitutes for absent teachers," The Santa Fe New Mexican, Feb. 20, 1996.*

Wilson, Carol. "The start of something big," Telephony, Jul. 6, 1992.*

"BellSouth annual meeting takes shareholders back to school and demonstrates education–related technologies," PR Newswire, Apr. 27, 1992.*

"TeacherReacher' A New Feature," NEA Today v11, Nov. 1992.*

Hippel et al. "Temporary employment: Can organizations and employess both win?" The Academy of Management Executive, vol. 11, pp. 93–104. Feb. 1997.*

Adecco [online], 1997 [retrieved on Mar. 10, 2002]. Retrieved from the Internet: <URL: http://www.Usadecco.com>.*

Poindexter, Joanne. "Teacher absence plan ok'd policy calls for using substitutes," Roanoke Times & World News. Aug. 9, 1996.*

LaPlante, Joseph. "New policy drafted to overcome shortage of substitute teachers," Providence Journal—Bulletin. Apr. 23, 1996.*

Givens, Ann. "Schools struggle to find substitute teachers," The Patriot Ledger. Dec. 20, 1997.*

LaPlante, Joseph. "Two school departments struggle to fill vacancies There's no substitute for a substitute . . . ," Providence Journal—Bulletin. Nov. 25, 1998.*

Sunoo, Brenda. "Thumbs up for staffing Web sites," Workforce v76n10 pp: 67–72, Oct. 1997 [Dialog].*

Business Ware Services, Inc.—TempWizard Solutions.

Bridgeware Systems—Staffing Industry Software Products.

ASA Staffing World—Expo: Exhibitors.

Clearview staffing software.

CRS, Inc.—Human Resource Automation, *SuB Finder, Make Every Day A Productive Day!*, CRS—SubFinder Page, pp. 1–3. Available at website: http://www.crs–ivr.com/sub–subfinder.asp.

CRS, Inc.—Human Resource Automation, *Interfacing*, CRS—Interfacing Page, pp. 1–2. Available at website: http://www.crs–ivr.com/sub2–interfacing.asp.

CRS, Inc.—Human Resource Automation, *Technology*, CRS—SubFinder Technology Page, p. 1 of 1. Available at website: http://www.crs–ivr.com/sub2–technology.asp.

CRS, Inc.—Human Resource Automation, *Network Configurations*, CRS—Network Configurations Page, pp. 1–3. Available at website: http://www.crs–ivr.com/sub2–networkconfigurations.asp.

eSchool Solutions, *Substitute Employee Management System (SEMS)*, © 1999, 2000, 2001 eSchool, pp. 1–2. Available at website: http://www.eschoolsolutions.com/sems.htm.

eSchool Solutions, *SEMS Advantage version 2.8 release announced*, Press Release Sep. 21, 2000, pp. 1–2. Available at website: http://www.eschoolsolutions.com/press_release/StaffCenter28–5–15–01.htm.

Computer Software Innovations, Inc., *Substitute Online Demo—an online tool for managing substitute teachers*, Substitute Logon, © 1999, p. 1 of 1.Available at website: http://www.subdemo.com/subdemo/webcode/4_0.html.

Substitute Online, Inc., *Logon Page*, © 1999, p. 1 of 1. Available at website: http://www.substituteonline.com/sub-Online/webcode/main/logon.asp.

T.H.E. Journal L.L.C., *Arrange for Substitute Teachers Online, Aug. 1999—Telecommunications*, T.H.E. Journal Online: Technological Horizons in Education, Jan. 2002, p. 1 of 1. Available at website: http://www.thejournal.com/magazine/vault/A2120.cfm.

Thomas L. Dean, "Decision Support for Coordinated Multi–Agent Planning", ACM 1986, pp. 81–91.

* cited by examiner

| STAFF | |
|---|---|
| Name | 92 |
| Title | 94 |
| Social Security Number | 96 |
| Pin | 98 |
| Cross reference to billing contact | 100 |
| Certification(s) | 102 |
| Substitute preferences | 104 |
| Schedule manipulation | 106 |
| Absence record | 108 |
| School reference | 110 |
| District reference | 112 |
| County reference | 114 |
| E-mail address | 116 |
| Fax number | 118 |
| Room/Office number | 120 |
| Special flag for recorded messages | 122 |
| Entitlement balances | 124 |
| Availability | 126 |
| Call time preferences | 128 |

| Pick-Lists | |
|---|---|
| Field preferences<br>Required<br>Visible<br>Default data | 152 |
| Field data<br>Type | 154 |
| Certification | 156 |
| Entitlement types | 158 |
| People | 160 |
| Schools | 162 |
| District | 164 |

| Business Data | |
|---|---|
| Billing address | 132 |
| Mailing address | 134 |
| Billing contact | 136 |
| Emergency contact<br>Evening<br>Weekend<br>Business | 138 |
| Phone number | 140 |
| Fax number | 142 |
| E-mail | 144 |
| PO # | 146 |
| Options turned on | 148 |

| School Data | |
|---|---|
| Name | 168 |
| Code | 170 |
| Type | 172 |
| Principal | 174 |
| Fax | 176 |
| Assign fax list | 178 |
| Phone | 180 |
| Secretary | 182 |
| Assign substitute | 184 |
| Assign staff | 186 |
| Record/Play | 188 |

| County Data |
|---|
| Name |
| Code |
| State |
| Associate districts |
| Assign substitutes |

FIG. 7

| District Data |
|---|
| Name |
| Code |
| District address |
| Phone |
| Fax |
| Assign fax list |
| Administrator/Board secretary |
| Associate schools |
| Assign substitutes |
| Assign staff |
| Record/Play |

FIG. 8

| Preferences |
|---|
| Options<br>Calling numbers<br>Select internet/intranet calling profiles<br>Password<br>Key value |

| Reports | |
|---|---|
| Acceptance/refusal history | 232 |
| Call History | 234 |
| Unfulfilled | 236 |
| Teacher manifest<br>Trend analysis | 237 |
| Substitute manifest | 238 |
| School manifest | 240 |
| Substitute performance<br>Acceptance rating<br>Flexibility rating<br>Trend analysis | 242 |
| Staff attendance | 244 |
| Staff calendars | 246 |
| Assignment reports<br>School<br>District<br>County | 248 |

| Wizard | |
|---|---|
| Phone | 252 |
| Emergency phone | 254 |
| Contact | 256 |
| Billing address | 258 |
| District | 260 |
| Title | 262 |
| Number of teachers (approx.) | 264 |
| Number of support staff (approx.) | 266 |
| Fax number | 268 |
| E-mail address optional | 270 |
| Billing contact optional | 272 |

FIG. 11

ABSENTEE REPORT

Date: 1/8/98      Time: 14:40:08

276 —

| Name | Social Security # | Phone # | Title | Time | Location |
|---|---|---|---|---|---|
| Smith, John, T. | 005-75-2243 | (609)-555-1111 | Social Studies | 14:39:50 | Howard |

Date: 1/8/98
Type: Sick
F/H Day: Half Day/PM

---

SUBSTITUTE ASSIGNMENT REPORT

Date: 1/8/98      Time: 17:08

278 — Name: Smith, John, T.    SSN: 005-75-2243
Title: Social Studies gr 8    School ID: 011
Location: Howard    School: 50 South School Street Substitute Information
    Name: Smith, Charles    SSN: 005-76-2214
    Contact Date: 1/8/98    Time: 17:06

---

CALL HISTORY REPORT

Date: 1/8/98      Time: 17:08

279 — Name: Smith, John, T.    SSN: 005-75-2243

| Date | Time | Line | Status | Sub |
|---|---|---|---|---|
| 1/8/98 | 17:04 | Answer | No Contact | Smith, Mark, C. |
| 1/8/98 | 17:05 | Answer | Rejected | Jones, Pat, B. |
| 1/8/98 | 17:06 | Answer | Accepted | Smith, Charles D. |

---

UNFULFILLED SUBSTITUTE ASSIGNMENT REPORT

Date: 1/8/98      Time: 19:10

280 — Name: Hitchens, Jack, R.    SSN: 008-73-2278
Title: English gr 11    School ID: 012
Location: Blair    School: 123 South Main Street

*FIG. 12*

| States | Events | | | | | |
|---|---|---|---|---|---|---|
| ST = State Transition | Start | Receive a call | Receive Valid Input | Receive Invalid Input | Timeout | Max Retries Reached |
| Telephony Application | | | | | | |
| Teacher Call-in | | | | | | |
| 281 Initial | Prompt for SS Number | Take phone offhook; Generate "Start" Event | ST: MainMenu | ST: ErrorState | ST: Hangup | N/A |
| 282 MainMenu | "1" Record Absence; "2" Listen to Entitlement Day Balances; "3" Special Instructions | N/A | "1" Pressed ST: Whenstep 1; "2" Pressed, Entitlements | Play Error Message; Generat "Start" Event | Play Error Message; Generate "Start" Event | ST: Goodbye |
| 283 Whenstep 1 | "1" Today; "2" Another Day | N/A | "1" ST: Shift; "2" ST: WhenAnotherDay | Play Error Message; Generate "Start" Event | Play Error Message; Generate "Start" Event | ST: Goodbye |
| 284 WhenAnotherDay | Prompt for day of the month followed by the "#" sign | N/A | ST: Shift | Play Error Message; Generate "Start" Event | Play Error Message; Generate "Start" Event | ST: Goodbye |
| 285 Shift | "1" Full Day; "2" Half day AM; "3" Half day PM; | N/A | ST: Absence Type or if required ST: StartTime | Play Error Message; Generate "Start" Event | Play Error Message; Generate "Start" Event | ST: Goodbye |
| 286 StartTime | Prompt for a military time | N/A | ST: Absence Type | Play Error Message; Generate "Start" Event | Play Error Message; Generate "Start" Event | ST: Goodbye |
| 287 Absence Type | List Valid Absence Types from database | N/A | ST: ConfirmAbsence or if required ST: RecordInstructions | Play Error Message; Generate "Start" Event | Play Error Message; Generate "Start" Event | ST: Goodbye |
| 288 RecordInstructions | Play instructions for recording a message | N/A | ST: ConfirmAbsence | Play Error Message; Generate "Start" Event | Play Error Message; Generate "Start" Event | ST: Goodbye |

*FIG. 13A (1 of 2)*

| | 1 | 2 | 3 | 4 | 5 | 6 | 7 | 8 |
|---|---|---|---|---|---|---|---|---|
| 289 | ConfirmAbsence | Replay contents of absence, prompt user to confirm; | N/A | "1" Pressed, ST: CheckComplete; "2" Pressed. ST: WhenAnotherDay | Play Error Message; Generate "Start" Event | Play Error Message; Generate "Start" Event | ST: Goodbye | |
| 290 | CheckComplete | Press "1" Complete call and get confirmation number; "2" Enter an additional absence day; | N/A | "1" Pressed, ST: Goodbye; "2" Pressed. ST: WhenAnotherDay | Play Error Message; Generate "Start" Event | Play Error Message; Generate "Start" Event | ST: Goodbye | |
| 291 | Entitlements | List Entitlement Day Balances, ST: MainMenu | N/A | N/A | N/A | N/A | N/A | |
| 292 | ErrorState | Play standard error message; ST: Goodbye | N/A | N/A | N/A | N/A | N/A | |
| 293 | Hangup | Hangup Phone ST: End | N/A | N/A | N/A | N/A | N/A | |
| 294 | Goodbye | Play goodbye message; ST: Hangup | N/A | N/A | N/A | N/A | N/A | |

FIG. 13A (2 of 2)

| States | Events | | | | | |
|---|---|---|---|---|---|---|
| ST = State Transition | Start | Receive a call | Receive Valid Input | Receive Invalid Input | Timeout | Max Retries Reached |
| School Administration Call-in | | | | | | |
| 295 MainMenu | Press "1" School Menu; Press "2" Entitlement Types Menu | N/A | "1" Pressed ST: RecordSchoolMenu; "2" Pressed ST: RecordEntTypesMenu | Play Error Message; Generate "Start" Event | Play Error Message; Generate "Start" Event | ST: Goodbye |
| 296 RecordSchoolMenu | Prompt for valid School Recording ID | N/A | ST: RecordSchool, or if "#" pressed ST: MainMenu | Play Error Message; Generate "Start" Event | Play Error Message; Generate "Start" Event | ST: Goodbye |
| 297 RecordSchool | Play existing recording, if exists then prompt "1" to record new prompt, "#" to return to School Menu | N/A | "1" Pressed, record/verify prompt, ST: RecordSchoolMenu;"#" ST: RecordSchoolMenu | Play Error Message; Generate "Start" Event | Play Error Message; Generate "Start" Event | ST: Goodbye |
| 298 RecordEntTypesMenu | Prompt for valid Entitlement Type Recording ID | N/A | ST: RecordEntTypes, or if "#" pressed ST: MainMenu | Play Error Message; Generate "Start" Event | Play Error Message; Generate "Start" Event | ST: Goodbye |
| 299 RecordEntTypes | Play existing recording, if exists then prompt "1" to record new prompt, "#" to return to Entitlement Menu | N/A | "1" Pressed, record/verify prompt, ST: RecordEntTypesMenu; "#" ST: RecordEntTypesMenu | Play Error Message; Generate "Start" Event | Play Error Message; Generate "Start" Event | ST: Goodbye |
| 300 ErrorState | Play standard error message; ST: Goodbye | N/A | N/A | N/A | N/A | N/A |
| 301 Goodbye | Thank caller for using system; ST: Hangup: | N/A | N/A | N/A | N/A | N/A |
| 302 Hangup | Hangup Phone ST: End | N/A | N/A | N/A | N/A | N/A |

*FIG. 13B*

| States | | Events | | | | | |
|---|---|---|---|---|---|---|---|
| ST = State Transition | Start | Receive a call | Receive Valid Input | Receive Invalid Input | Timeout | Max Retries Reached | |
| FrontLine Administration Call-in | | | | | | | |
| RecordFilesMenu | Prompt for the recording ID of the message file | N/A | ST: RecordFiles | Play Error Message; Generate "Start" Event | Play Error Message; Generate "Start" Event | ST: Goodbye | |
| RecordFiles | Play existing recording, if exists then prompt "1" to Record new prompt, "#" to return to Record Files Menu | N/A | "1" Pressed, record/verify prompt, ST: RecordFiles; "#" ST: RecordFiles | Play Error Message; Generate "Start" Event | Play Error Message; Generate "Start" Event | ST: Goodbye | |
| ErrorState | Play standard error message; ST: Goodbye | N/A | N/A | N/A | N/A | N/A | |
| Goodbye | Thank caller for using system; ST: Hangup: | N/A | N/A | N/A | N/A | N/A | |
| Hangup | Hangup Phone ST: End | N/A | N/A | N/A | N/A | N/A | |

Row labels: 303 RecordFilesMenu, 304 RecordFiles, 305 ErrorState, 306 Goodbye, 307 Hangup

FIG. 13C

| States | | Events | | | | |
|---|---|---|---|---|---|---|
| ST = State Transition | Start | Receive a call | Receive Valid Input | Receive Invalid Input | Timeout | Max Retries Reached |
| Substitute Call-out | | | | | | |
| MakeTheCall | Dial the telephone number; ST: CallAnalysis | N/A | N/A | N/A | N/A | N/A |
| CallAnalysis | Determine how the call was or was not answered | N/A | Person Answers; ST: Identify | Person does not answer; | N/A | N/A |
| Identify | Prompt for SS Number or PIN Number | N/A | ST: PresentRequest | Generate "Start" Event | N/A | ST: Goodbye |
| PresentRequest | Play request, prompt substitute to "1"Replay; "2"Accept, "3"Reject | N/A | "1"Replay, Generate Start Event; "2" ST: AcceptRequest; "3" ST: RejectRequest | Play Error Message; Generate "Start" Event | Play Error Message; Generate "Start" Event | ST: Goodbye |
| RejectRequest | Reject w/No more calls; "2"Reject allowing for additional calls | N/A | ST: Goodbye | Play Error Message; Generate "Start" Event | Play Error Message; Generate "Start" Event | ST: Goodbye |
| AcceptRequest | Play confirmation number; ST: Goodbye | N/A | N/A | N/A | N/A | N/A |
| ErrorState | Play standard error message; ST: Goodbye | N/A | N/A | N/A | N/A | N/A |
| Goodbye | Thank caller for using system; ST: Hangup: | N/A | N/A | N/A | N/A | N/A |
| Hangup | Hangup Phone ST: End | N/A | N/A | N/A | N/A | N/A |

*FIG. 13D*

| States | Events | | | | | |
|---|---|---|---|---|---|---|
| ST = State Transition | Start | Receive a call | Receive Valid Input | Receive Invalid Input | Timeout | Max Retries Reached |
| Fax Callout | | | | | | |
| MakeTheCall | Call FaxNumber ST: CallAnalysis | N/A | N/A | N/A | N/A | N/A |
| CallAnalysis | Determine if Fax Answered | N/A | Fax Answered ST: FaxSend | Fax did not Answer ST: Hangup | N/A | N/A |
| FaxSend | Send Fax ST: End | | | | | |
| ErrorState | Play standard error message; ST: Goodbye | N/A | N/A | N/A | N/A | N/A |
| Goodbye | Thank substitute using system; ST: Hangup: | N/A | N/A | N/A | N/A | N/A |
| Hangup | Hangup Phone ST: End | N/A | N/A | N/A | N/A | N/A |

*FIG. 13E*

| Client | | Events | | | | | | | | | | |
|---|---|---|---|---|---|---|---|---|---|---|---|---|
| States | | Have Data | Don't Have Data | File Created | Connect FTP | Did Not Connect to FTP | File not there | Max Tries | Startup | | Bad format | Save |
| Extract | 323 | Create file ST: Send | Create File ST: Send | | | | | | | | | |
| Send | 324 | | | Create FTP Session; Send File | Verify file was sent ST: Receive; Else ST: Error | | | Error | | | | |
| Receive | 325 | | | | | | Check for file if pres. ST: import Else ST: Wait | Error | | | | |
| Import | 326 | | | | | | | | Opens files; Verify file format | Refuse all Changes | | |
| Cleanup | 327 | | | | | | | | Moves files to archive; Sets last sync dates for all files | | | Save Changes |
| Error | | | | | | | | | | | | |
| | | ① | ② | ③ | ④ | ⑤ | ⑥ | ⑦ | ⑧ | ⑨ | ⑩ | ⑪ ⑫ |

*FIG. 13F (1 of 2)*

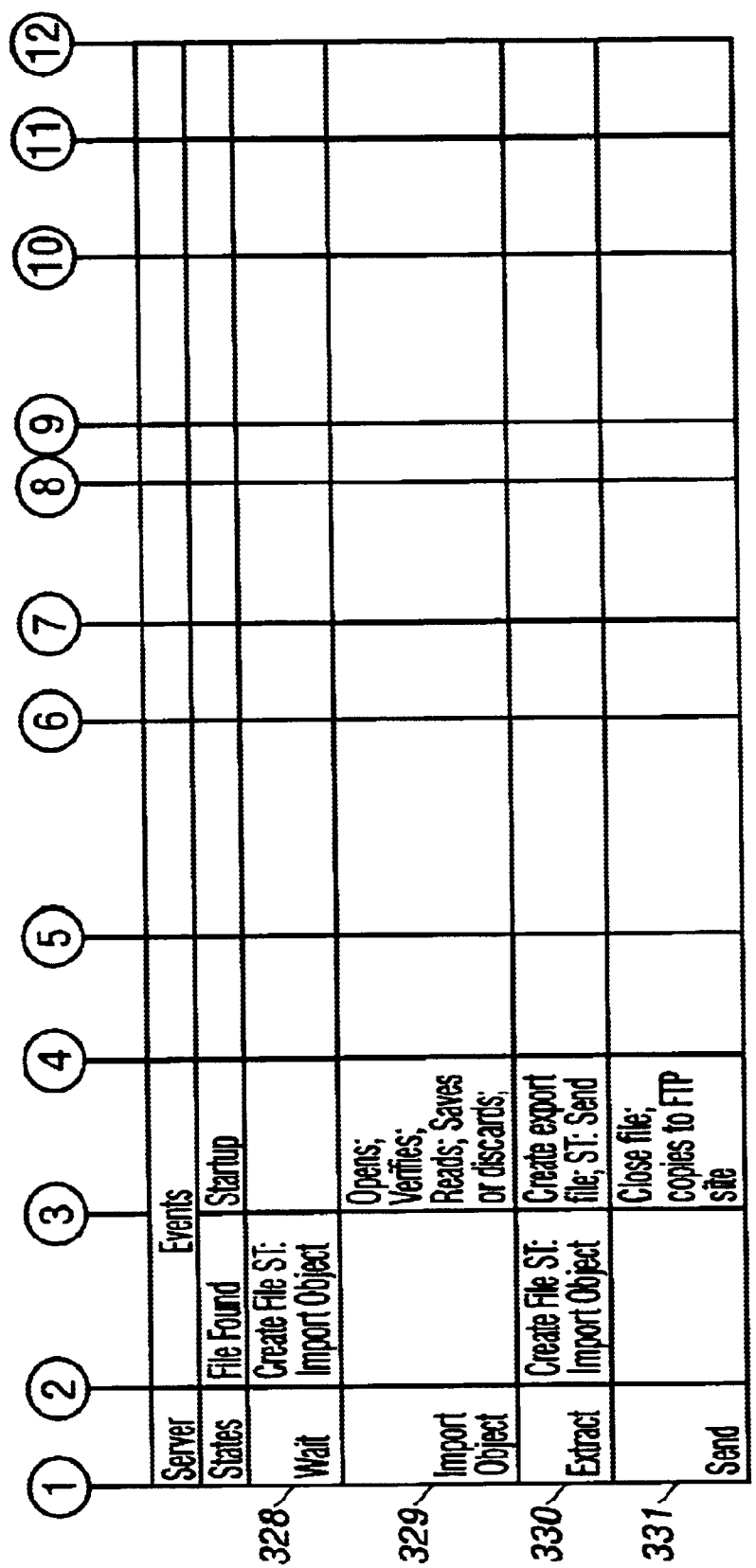
FIG. 13F (2 of 2)

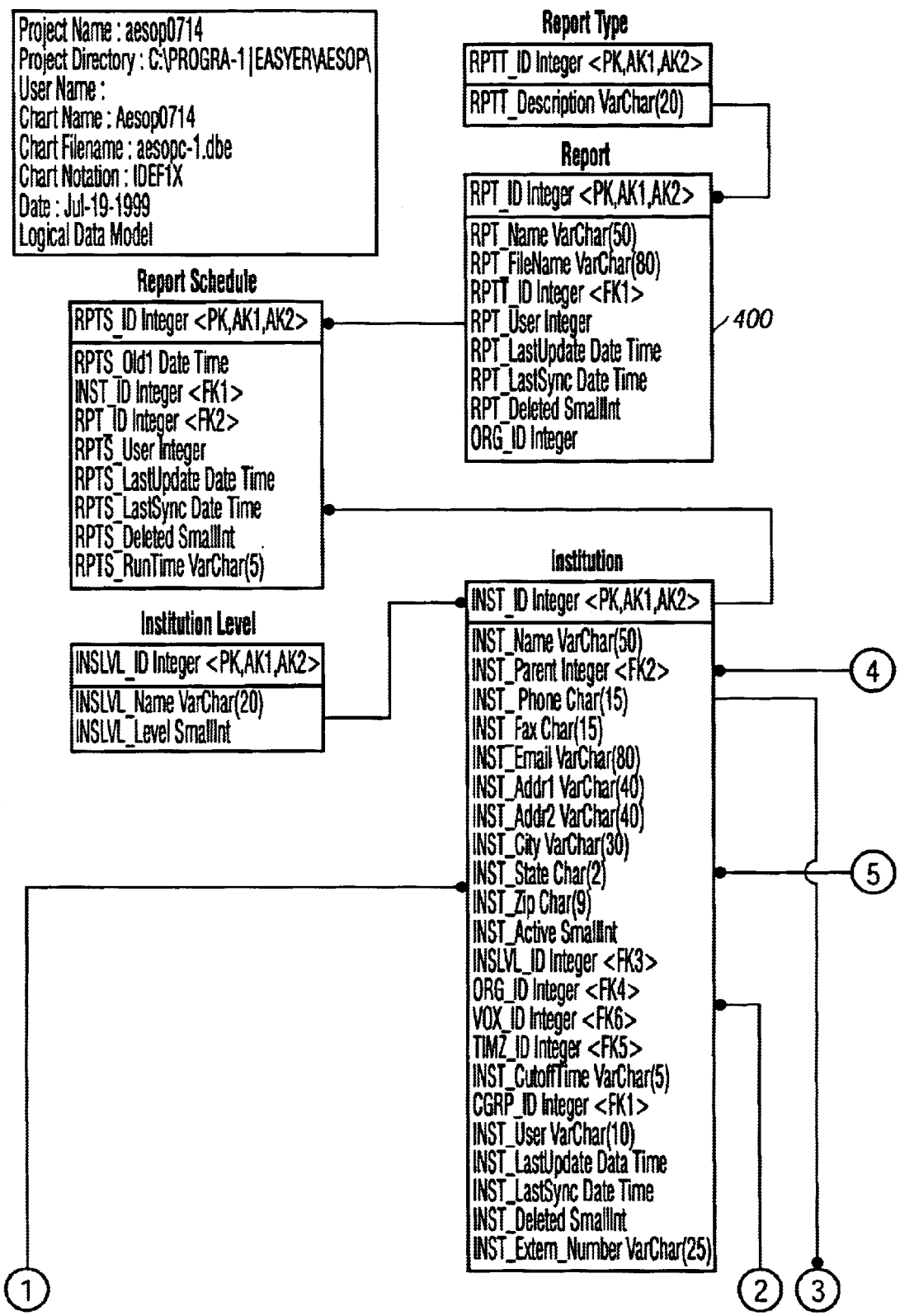
FIG 14 (1 of 10)

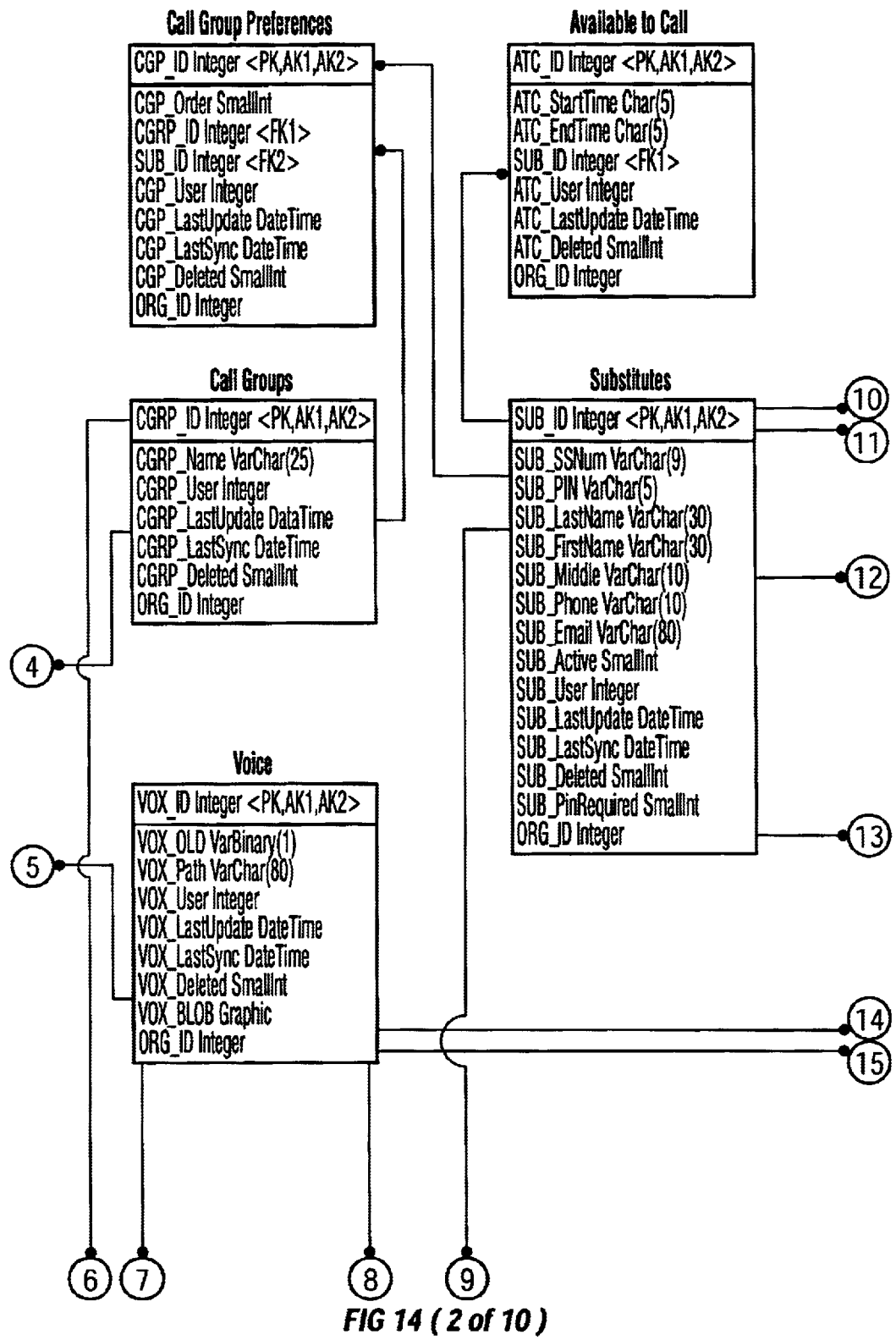
FIG 14 ( 2 of 10 )

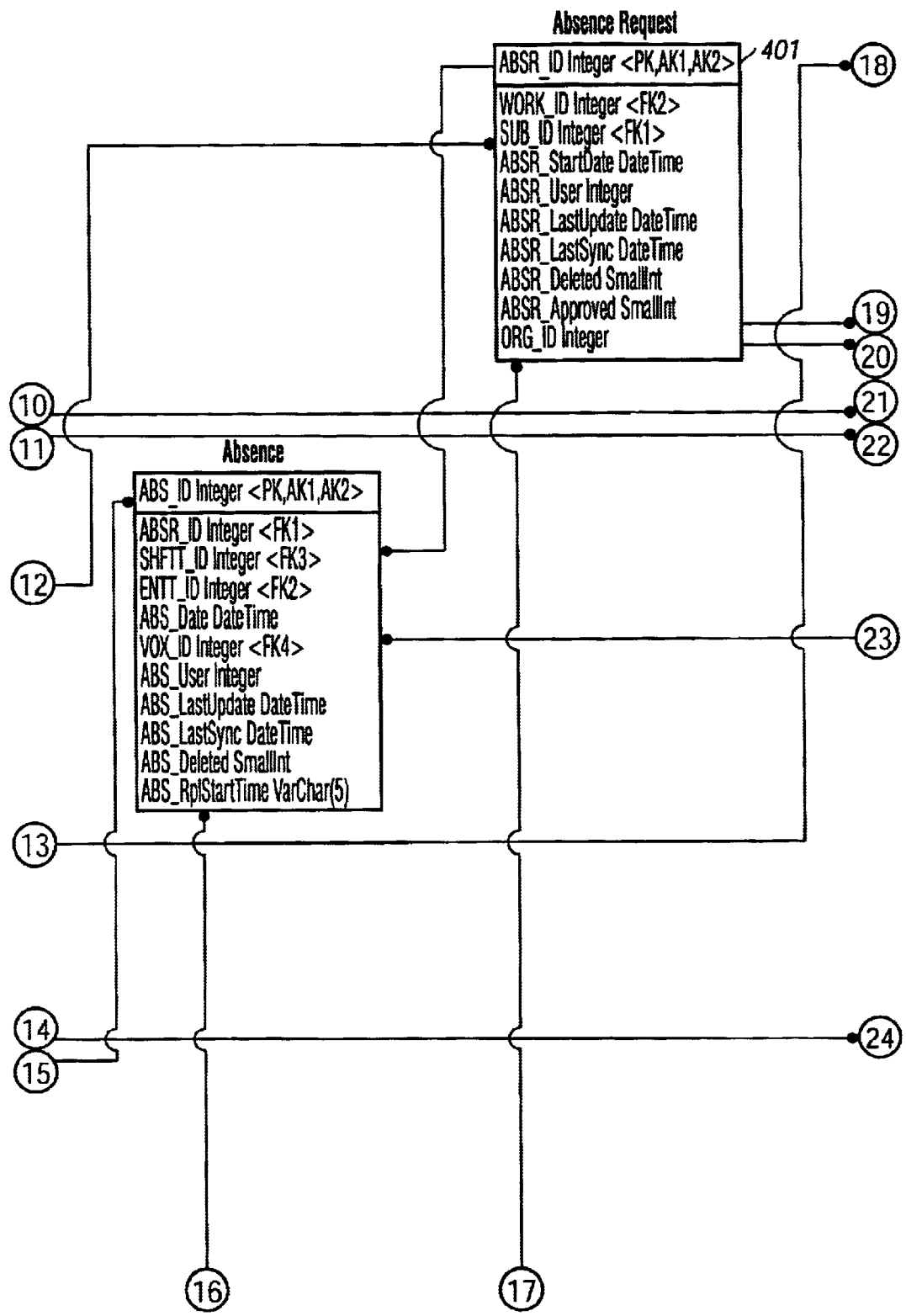
FIG 14 (3 of 10)

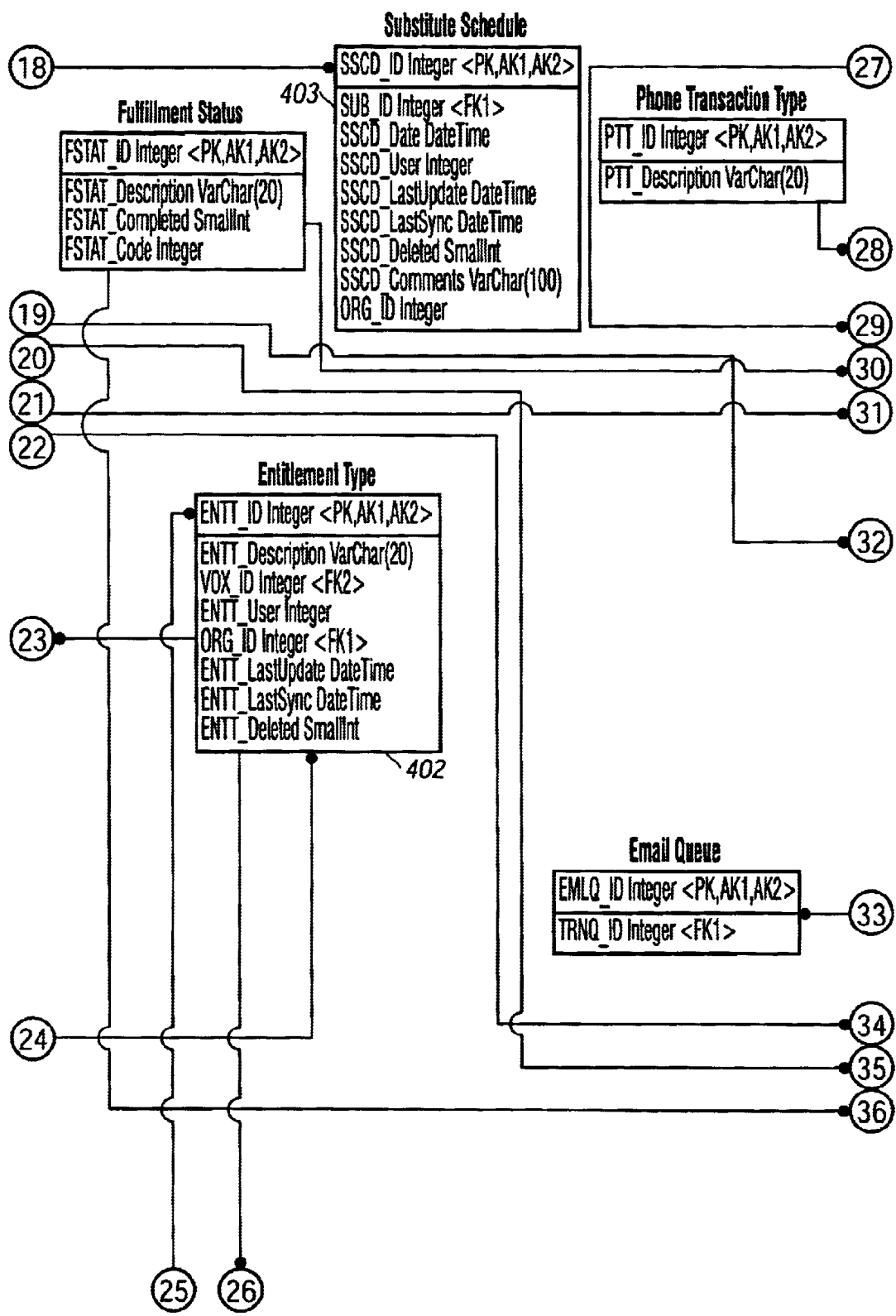
FIG 14 ( 4 of 10 )

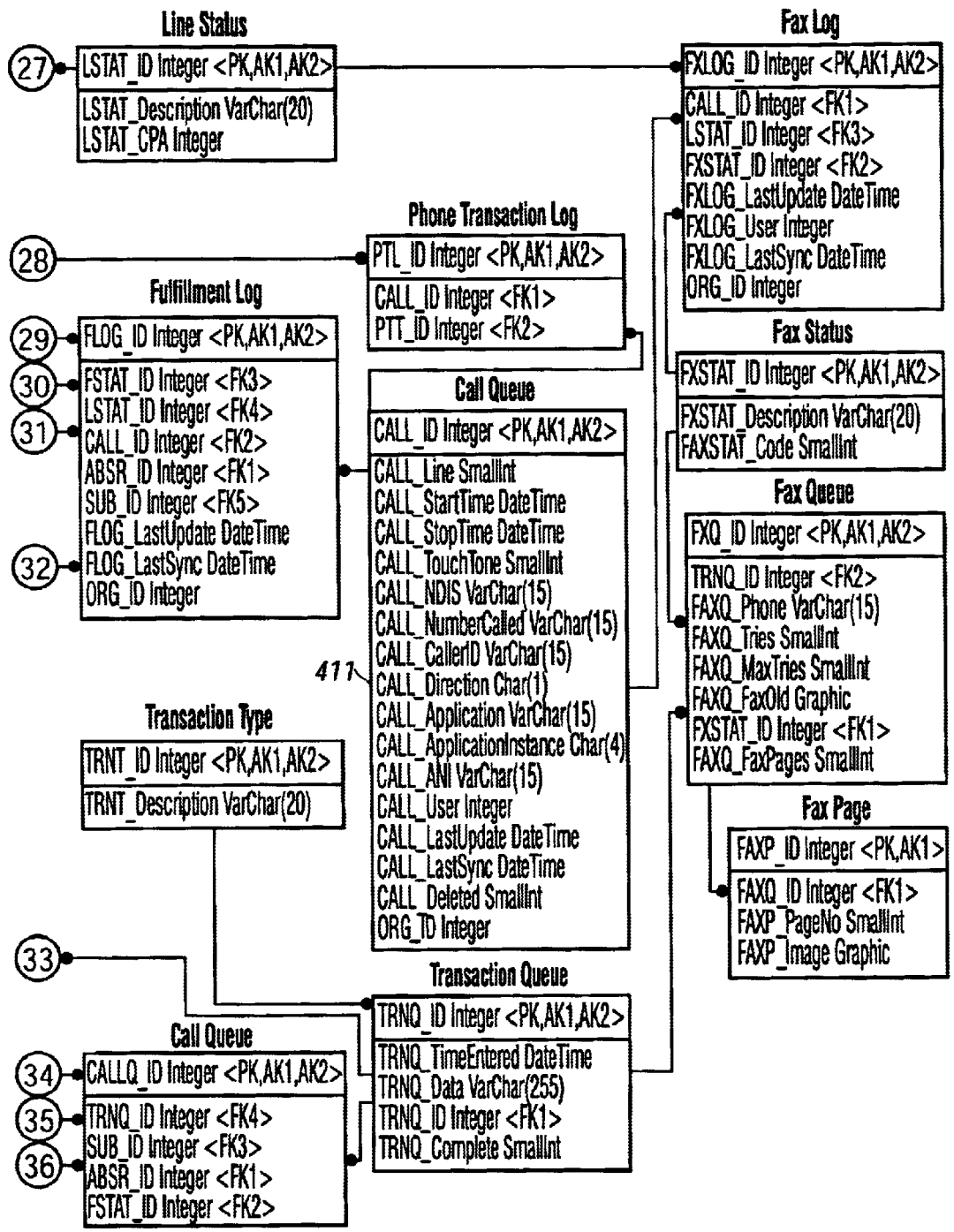
FIG 14 (5 of 10)

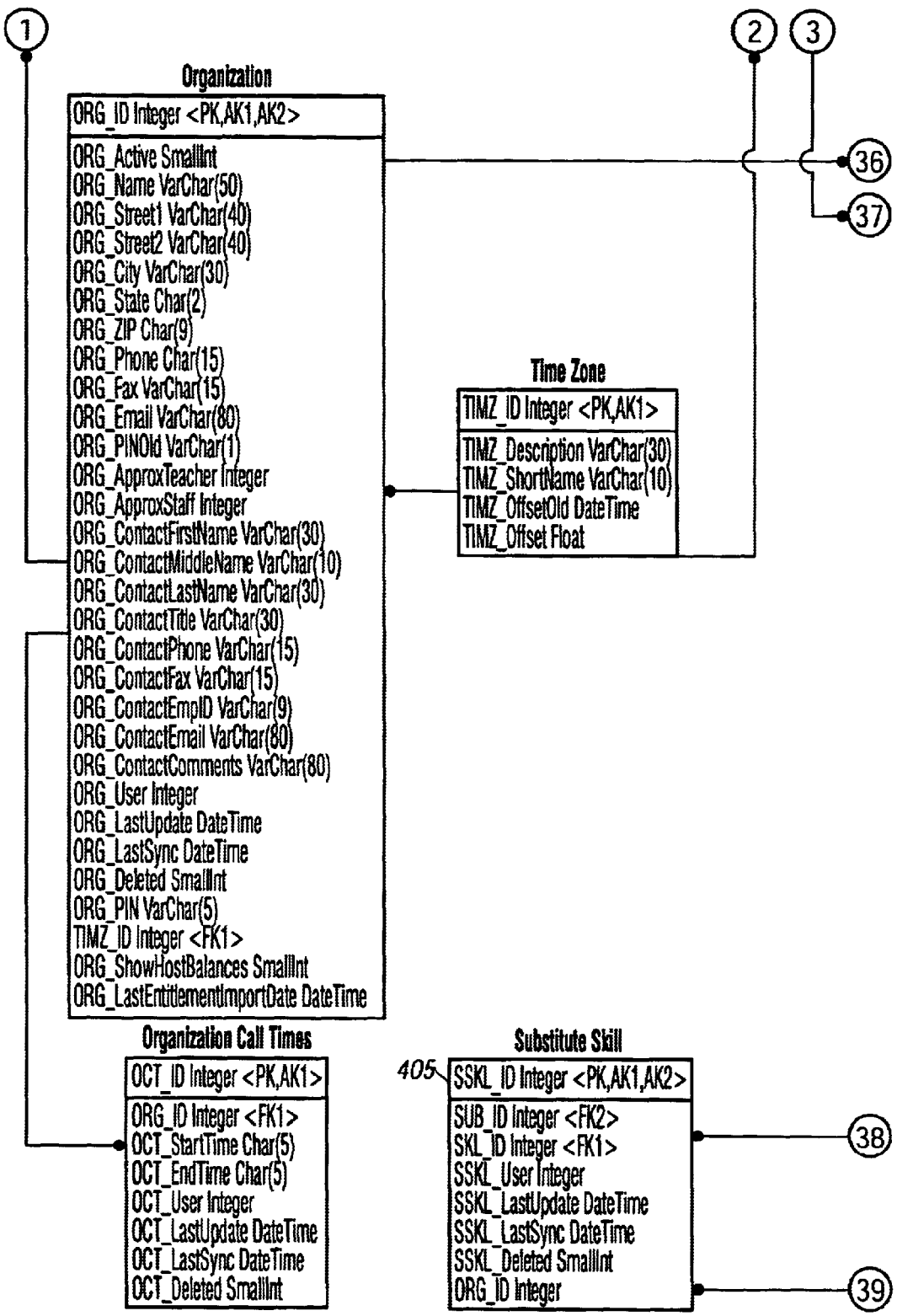
FIG 14 (6 of 10)

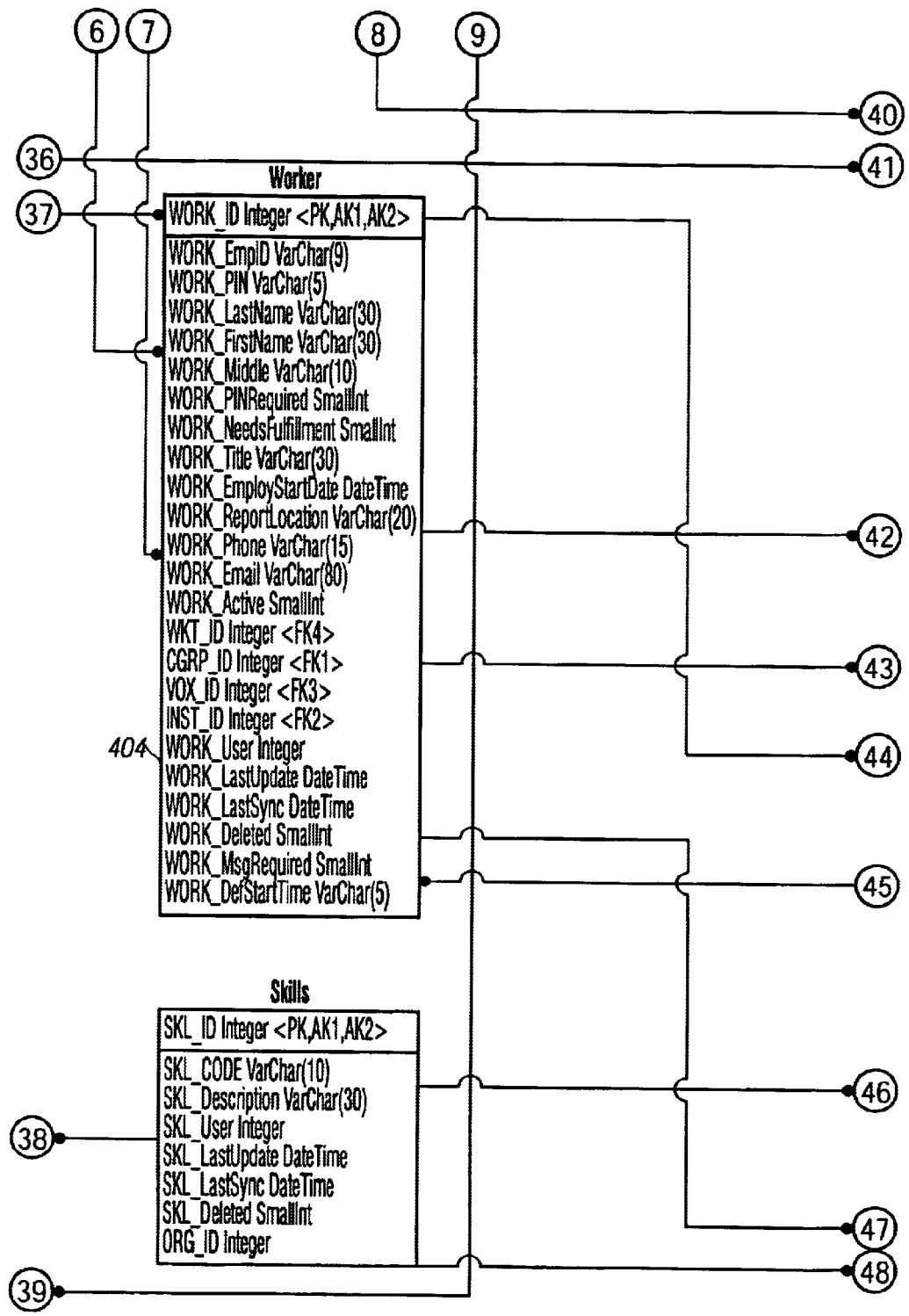
FIG 14 ( 7 of 10 )

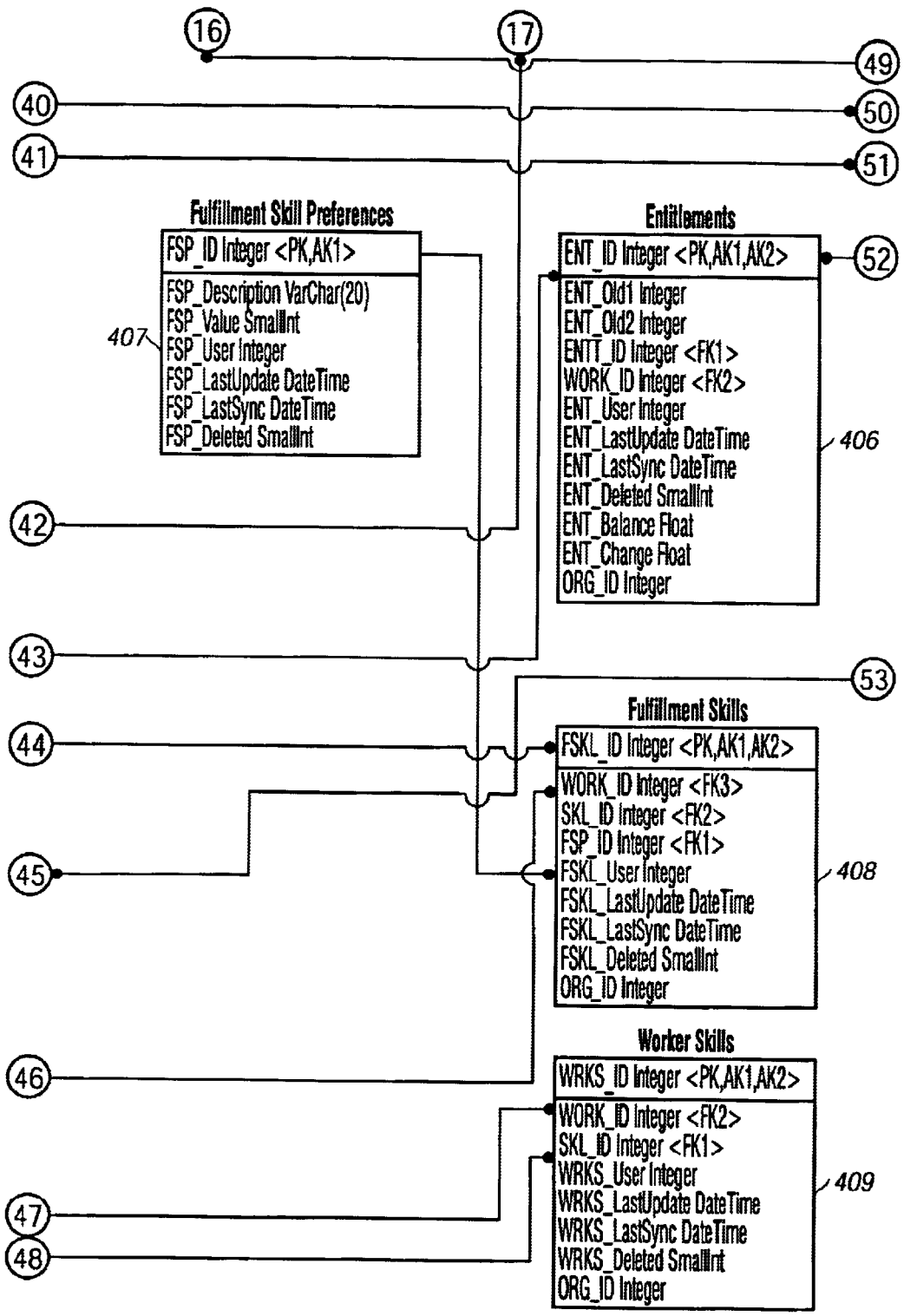
FIG 14 ( 8 of 10 )

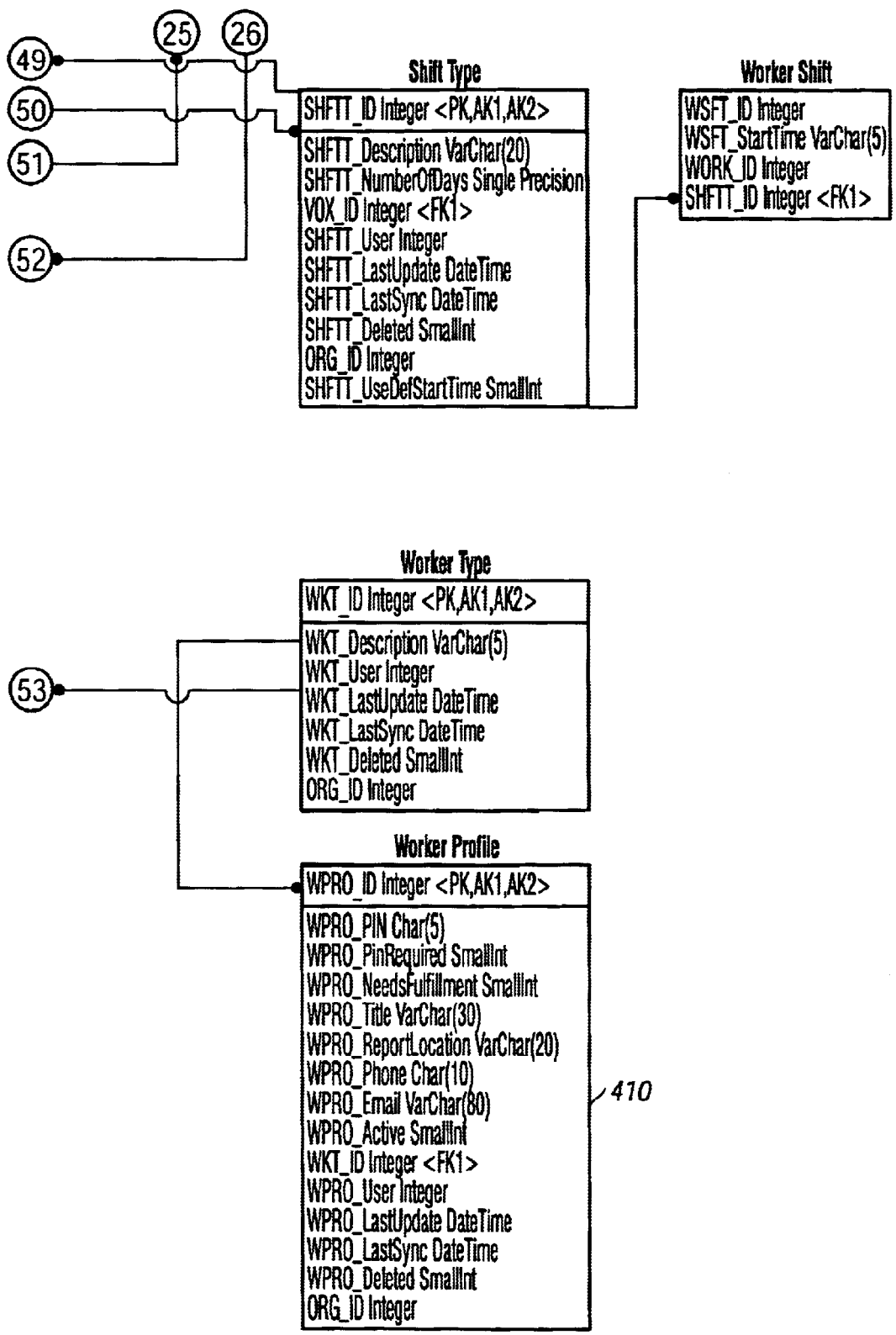
FIG 14 (9 of 10)

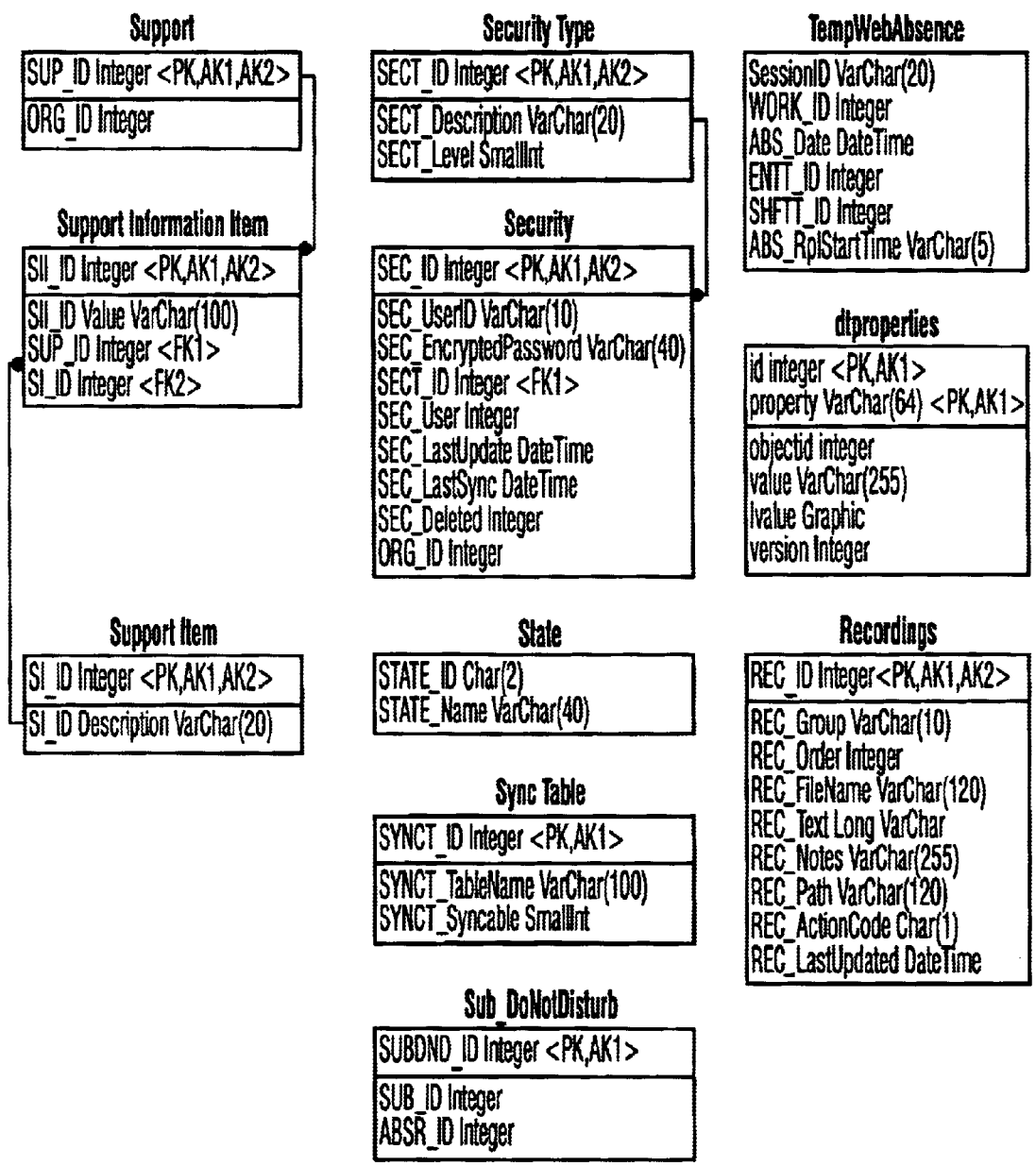
FIG 14 (10 of 10)

SYSTEM AND METHOD FOR PERFORMING SUBSTITUTE FULFILLMENT INFORMATION COMPILATION AND NOTIFICATION

CROSS-REFERENCE TO RELATED APPLICATION

The present application is a continuation-in-part of U.S. application Ser. No. 09/217,116, filed Dec. 21, 1998 now U.S. Pat. No. 6,334,133 which is hereby incorporated herein by reference.

FIELD OF THE INVENTION

The present invention generally relates to systems and methods for human resources management. More particularly, the present invention relates to systems and methods for performing substitute fulfillment, compiling absence and entitlement information, notifications of unexpected events, and notifications of benefits and policies. Still more particularly, the present invention relates to systems and methods for shifting the burden of performing substitute fulfillment and information notification away from affected organizations, for centralizing substitute fulfillment and notification tasks, and for enhancing the efficacy and reliability of these procedures.

BACKGROUND OF THE INVENTION

To date, location of a replacement to fill a temporary employee absence in an organization, a process referred to as "substitute fulfillment," has generally been an unreliable, labor-intensive, often panic-driven, process. In any organization, the absence of a worker can have perceptible consequences throughout the workplace. The consequences of an employee absence will vary with the nature of the work environment and with the scope of the employee's position; other relevant factors may include, for example, upcoming deadlines and patterns of absenteeism in the particular organization. Those consequences may be immediate and drastic, as when an assembly line shuts down due to the absence of a critical worker on the line, or more attenuated and moderate, as when another employee is distracted from his primary task to answer telephones due to the absence of the office receptionist. In a typical case, those consequences may include diversion of management resources to address the consequences of the absence; delays in accomplishing projects in which the absentee has a role; displacement of other employees, who must fulfill the absentee's role, either by express assignment or in order to complete their own tasks; reduced productivity; fines levied against the organization, particularly if the absence impacts safety or other government-regulated aspects of the work environment; and, in an extreme but not uncommon case, the inability to complete the central task of the organization.

In the latter case, assignment of a substitute worker is imperative or "mission-critical"—without a substitute worker, the mission of the organization will not go forward—so filling the vacancy with a temporary replacement is the only acceptable alternative; in other cases, assignment of a substitute worker may not be mission-critical, but may nevertheless be a preferred policy in order to minimize the consequences of any absence. As a result, an upcoming absence may impact the workplace even before the absence period begins, as managers consider ways of compensating for the absence. Examples of work environments in which substitute fulfillment may be a mission-critical task include schools, emergency services, and manufacturing plants, particularly plants with an assembly-line operation. The replacement of an absent teacher with a substitute teacher is a commonly occurring example of a mission-critical substitute-fulfillment objective.

Thus, in an organization where a substitute is necessary or desired, when an employee notifies the organization that he will be absent, management must necessarily turn its attention to the substitute fulfillment task, or risk a noticeable reduction in the productivity of the organization or an inability to accomplish the business of the organization for the entire absence period. Although seemingly simple in concept, the substitute fulfillment task is non-trivial, requiring managers to devote significant time, effort and other resources, with no guarantee of success. Substitute fulfillment is complicated by the number of intermediate tasks that must be accomplished and constraints that must be satisfied to successfully realize a particular substitute fulfillment in a timely fashion.

The absent worker may, and usually does, provide notice of his impending absence less than a day, or even only several hours, before he is expected at work. Thus, management often enters the substitute fulfillment task with little time to carry it out; if the process is not automated in any aspect, then management must direct each step of the process. Once the absence, which may extend from only hours to several days, or even months, is known, management must typically identify the scope of the absentee worker's critical responsibilities and skills to establish criteria for identifying a suitable substitute and develop a substitution candidate profile. Typically, multiple substitution candidate profiles may be established, with more demanding requirements for ideal or preferred substitutes, and with less demanding, threshold requirements for merely acceptable substitutes. Once the appropriate qualifications for an acceptable substitute are established, management may consider potential replacements from a prepared list of candidates, or alternatively, management may identify potential candidates by some other means. Candidates may be regular employees of the affected workplace, for example, assembly line workers at a manufacturing plant who work different shifts from the absentee, or, persons from outside the workplace, for example, substitute teachers registered with a school district.

Management must then contact potential replacements, typically by telephone, and determine whether potential replacements are available and willing to work at the desired times in the desired position. Merely reaching potential substitutes may require several attempts. In the best case, management will eventually locate and assign an available substitute to cover the vacancy; in the worst case, management will be unable to find a substitute, despite having expended significant resources on the substitute fulfillment task. The substitute fulfillment task is substantially, but not wholly complete when the available substitute is assigned; typically, management performing the substitute fulfillment must then notify the appropriate persons that a substitute has been confirmed to facilitate inclusion of the substitute in the workplace. Due to the complexity of the substitute fulfillment task and the diversion of resources it entails, many workplaces may forego substitute fulfillment despite its desirability.

Substitute fulfillment is a routine practice in the education system, especially at the primary and secondary school levels. An example of substitute fulfillment for a high school teacher is provided herein as an accessible example and for reference. The substitute fulfillment task usually is triggered in a school when a teacher "calls in sick." Depending on the degree to which substitute fulfillment is automated in the school or district, locating a substitute teacher may require the efforts of a principal or other administrator, as well as several support staff members. Once a teacher has called in sick or otherwise signaled his absence, perhaps the night before or even the morning of the absence, the responsible administrator must disrupt her schedule to focus on the substitute fulfillment task. If she is unable to find a substitute teacher, the operation of the class, the department, and even the whole school may be disrupted. For example, the affected classes may fall behind in their scheduled curricula, an administrator or other teachers may have to neglect their other duties to cover for the absentee, and the school may even be fined by the state for failing to provide an acceptable substitute teacher.

In order to perform the substitute fulfillment, generally, first, the administrator must determine which classes the absent teacher teaches and what skills are required of a replacement. In the education system context, state law may also regulate the minimal qualifications for a substitute teacher, both in general and for the specific type of position that must be filled. Thus, if an absent teacher is a high school science teacher who teaches AP Physics and basic chemistry, a replacement may be required not only to have a college degree but also specifically to have pursued college-level classes in both subjects. The administrator then typically identifies acceptable substitutes from the substitutes registered with the school district. The administrator then telephones potential substitutes to check their availability and willingness to take on the assignment. Sometimes she may have to telephone an individual substitute several times to speak with him and obtain a response. If she locates and confirms a substitute, she may then have to inform the relevant department head or other teachers and to complete paperwork to process the substitute assignment.

At present, computer systems for supporting substitute fulfillment are known in the education field. Individual schools in a school district typically share a single such system installed at the school district level. Typical system equipment includes at least one dedicated computer, combined with specialized telephony equipment, including multiple phone lines, and other equipment. The equipment is expensive and set-up of the substitute fulfillment system may be technically demanding. A school district must invest in equipment adequate to handle its anticipated volume of use. In order to upgrade the system, often all of the equipment must be replaced, at substantial expense and annoyance. Such systems are sold by several vendors under the trade names SubFinder (CRS, Inc.), and Substitute Teacher Management System (TSSI).

In these automated systems, necessary information relating to teachers, substitution criteria, registered substitutes, etc. is entered and maintained in a database through software on the system at the school district level. Individual schools in the district access the system through a dial-up connection with a modem from a computer located at the school. School district personnel must receive absence notification and initiate and oversee the substitute fulfillment procedure with support from the system. Significant involvement by school district personnel and the system vendor may be required, including hardware and software support of the system. Thus, operation of the substitute fulfillment system by the individual schools may be technically demanding and require the presence of trained personnel.

In light of the mission-critical nature of the substitute fulfillment task in the education system, the reliability of the system is a key concern. At present, substitute fulfillment systems are not adequately reliable. Power failures and other catastrophic events may undermine the efficacy of systems operated at the school district level. Because all information is maintained locally at the school district level, system failures may result in partial or total data loss. Backup systems entail additional expense, often not within the budgets of school systems.

Present systems are inherently limited in their capabilities due to equipment limitations, access constraints, and operation requirements; thus, each district typically purchases and installs a system and independently handles its own substitute fulfillment using the purchased system. As a result of the decentralized nature of substitute fulfillment management in present systems, it is virtually impossible for school districts to share information and common substitute fulfillment resources. For the same reason, compilation or aggregation of data relating to substitute fulfillment across school districts is difficult and uncommon. All of the costs, responsibilities, disadvantages, and inconveniences of substitute fulfillment are typically borne exclusively and separately by individual school districts and schools.

Additionally, organizations including but not limited to schools, school districts and business entities require a centralized system and method of tracking workers' absences and entitlements, including but not limited to used and available vacation, personal and sick time. Administrators and workers have a timeconsuming, inefficient and often inaccurate procedures for recording absences and entitlements. This results in labor-intensive recordation procedures and often no universal record (for both access by administrators and workers) detailing up-to-date absences and entitlements for the particular worker, a group of workers or the overall workforce of the organization.

Organizations also require an efficient, current and easily accessible system and method for recording and announcing benefits, policies, current and unexpected events. Presently organizations often resort to bulletin boards, which are not remotely accessible, or phone chains, which are inefficient, unreliable, and labor-intensive.

Illustrated here with particular examples, these same considerations are generally applicable to any organization. Due to the mission-critical nature of these tasks, it is crucial that any equipment or method relating to substitute fulfillment, information compilation or notification be reliable and efficient. It is an advantage of the present invention to provide a reliable, efficient system and method of substitute fulfillment, information compilation and notification. It is a further advantage of the present invention to provide an automated system and method that has low overhead and requires little organization involvement or oversight. It is another advantage of the present invention to broaden the scope of system connectivity and to include an interface to the Internet. It is yet another advantage of the present invention to maintain a central database of related information and to share information across organizations. It is still another advantage of the present invention to provide trend analysis and reporting. An improved method of substitute fulfillment, information compilation and notification is useful to any organization that anticipates a need to assign replacement workers to fill temporary absences.

SUMMARY OF THE INVENTION

The present invention is directed to an automated system and method for performing substitute fulfillment for an organization that wishes to replace an employee during a temporary absence; performing placement of floating workers; tracking absences and entitlements of workers; notifying interested parties regarding unexpected events, daily announcements, policies and benefits; and bidding for temporary workers. Generally, at least one presently preferred embodiment of the present invention contemplates that a substitute fulfillment, information compilation or notification system includes a main server that manages substitute fulfillment, compilations and notifications for multiple client organizations. The server maintains substitute fulfillment data, contact data, notification information and other data centrally in a database for multiple client organizations employing the system. Organizations enter substitute fulfillment data and contact data locally at the organization and transmit the data to the server. An organization maintains its own parallel database on a local application. The system periodically sends updates to and receives updates from an organization's local database.

In one preferred embodiment, an employee registers an absence and triggers the automated substitute fulfillment procedure by contacting the substitute fulfillment system. In another preferred embodiment, a business entity, school or school district registers contact information and the system contacts the desired parties regarding unexpected events, benefits, policies or daily announcements. Yet another embodiment encompasses a system which tracks information regarding workers' absences and entitlements.

In at least one preferred embodiment, the system contacts the organization with the absence information. Once an absence is registered, the substitute fulfillment system uses the database to identify potential substitutes, temporary workers or floating workers ("Substitutes") based on preferences or criteria selected by the organization and other information. The system then contacts the identified potential Substitutes to inquire regarding their availability. In a preferred embodiment, the system continues to contact potential Substitutes until one is found or until the list is exhausted and all potential Substitutes have refused the assignment.

If a Substitute accepts the assignment, the system relays instructions, key information and messages from the worker to the Substitute, if necessary. Whether or not a Substitute is successfully assigned, the system contacts the organization and other desired update recipients to report on the result. In at least one preferred embodiment, the system relies on multiple communications channels to ensure reliability.

The system may also track the absences of each particular worker and the worker's entitlements. Upon accessing the system, the worker or an administrator can inquire about the worker's absences and entitlements. The system stores the information on the absences and entitlements in the database.

In another embodiment, the system records announcements regarding unexpected or current events, benefits or policies when the system is accessed by an authorized party for this purpose. The system then contacts the interested parties regarding the announcement or allows the interested parties to access the announcement upon request. Additionally, if desired, the reports detailing the contacted parties and the parties with which contact has been unsuccessful may be generated.

The invention may also be used to conduct auctions of idle temporary workers. The organization which requires temporary workers, may designate the skills and background required of the worker and the date and time for the position along with the price the organization is willing to pay. The system then fulfills these requests starting with the highest bidder.

It is understood that "workplace" or "organization" or "entity" when used in this application refers not only to more traditional work environments, but to any work environment amenable to substitute fulfillment, information compilation or notification, such as an employee unit that works cooperatively together within a larger organization, for example, an emergency services unit.

BRIEF DESCRIPTION OF THE DRAWINGS

The present invention and its presently preferred embodiments will be better understood by way of reference to the detailed disclosure hereinbelow and to the accompanying drawings, wherein:

FIG. 4 is a diagram showing an exemplary data structure of a client record stored in accordance with a preferred embodiment of the present invention.

FIG. 5 is a diagram showing an exemplary data structure of a list of pick-lists generated in accordance with a preferred embodiment of the present invention.

FIG. 6 is a diagram showing an exemplary data structure of a school record stored in accordance with a preferred embodiment of the present invention.

FIG. 7 is a diagram showing an exemplary data structure of a county record stored in accordance with a preferred embodiment of the present invention.

FIG. 8 is a diagram showing an exemplary data structure of a district record stored in accordance with a preferred embodiment of the present invention.

FIG. 9 is a diagram showing an exemplary data structure of a user-preferences record stored in accordance with a preferred embodiment of the present invention.

FIG. 10 is a diagram showing a list of available reports selectable by a user in accordance with a preferred embodiment of the present invention.

FIG. 11 is a diagram showing an exemplary data structure for initial registration with a substitute fulfillment system in accordance with a preferred embodiment of the present.

FIG. 12 is a representation of exemplary reports generated in accordance with a preferred embodiment of the present invention.

FIG. 13 is a state diagram illustrating the operation of a computer-implemented system for performing substitute fulfillment in accordance with a preferred embodiment of the present invention.

FIG. 14 depicts a block diagram illustrating a data structure used for storing information in accordance with a preferred embodiment of the present invention.

DESCRIPTION OF THE PREFERRED EMBODIMENTS

System Overview

Figure 1:
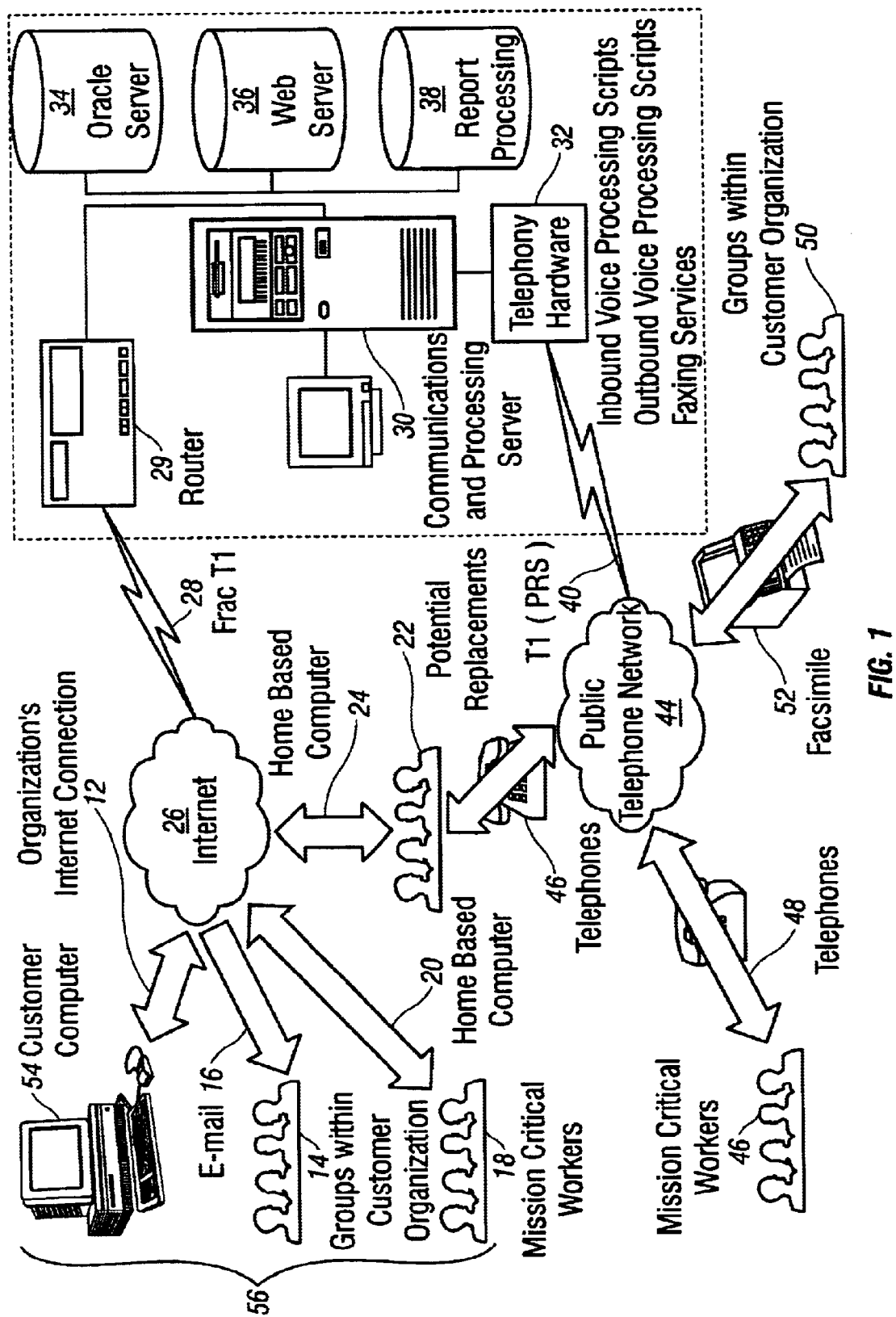
FIG. 1 is a block diagram showing a substitute fulfillment system in accordance with a preferred embodiment of the present invention.

There is generally indicated at 10 in FIG. 1 a block diagram of a substitute fulfillment, information compilation or notification system in accordance with a preferred embodiment of the present invention. The main components of system 10 are a communications and processing server 30, connected to an Oracle™ server, or like database engine 34, a web server 36, and a report processing unit 38, with multiple communication channels for clients, workers and potential replacements. Each unit or server may run on a separate computer or on the same computer as any of the other servers. The communications and processing server 30 manages the system 10, including managing communications interfaces and processing substitute fulfillment, information compilation or notification events. The central communications and processing server 30 also maintains the database 34, which contains data files with data records for multiple client organizations. The Oracle™ server maintains and stores the database. The Web Server manages and stores web pages accessible from the Internet. The Report Processing Unit generates data for the reporting requirements of the system.

The substitute fulfillment, information compilation or notification database 34 is depicted in FIG. 14 and, more particularly, from data records 400 to 410. The states in which and between which the system operates are shown in FIGS. 13A–F.

The communications and processing server is connected to telephony hardware 32. Telephony hardware 32 preferably includes multiple phone lines with a connection 40 to a public telephone network 44. In a preferred embodiment, communications and processing server 30 is further connected to a router 29 with a connection 28 to the Internet, shown generally at 26. Preferably, communications and processing server 30 maintains at least two interfaces, most preferably two World Wide Web interfaces, for access to the substitute fulfillment system 10 via the Internet 26. The first such interface or web site is principally directed towards client organizations 56 such as, for example, school districts. The second such interface or web site is principally directed toward workers 18 and potential replacement workers 22, such as, for example, teachers and substitute teachers.

Figure 2:
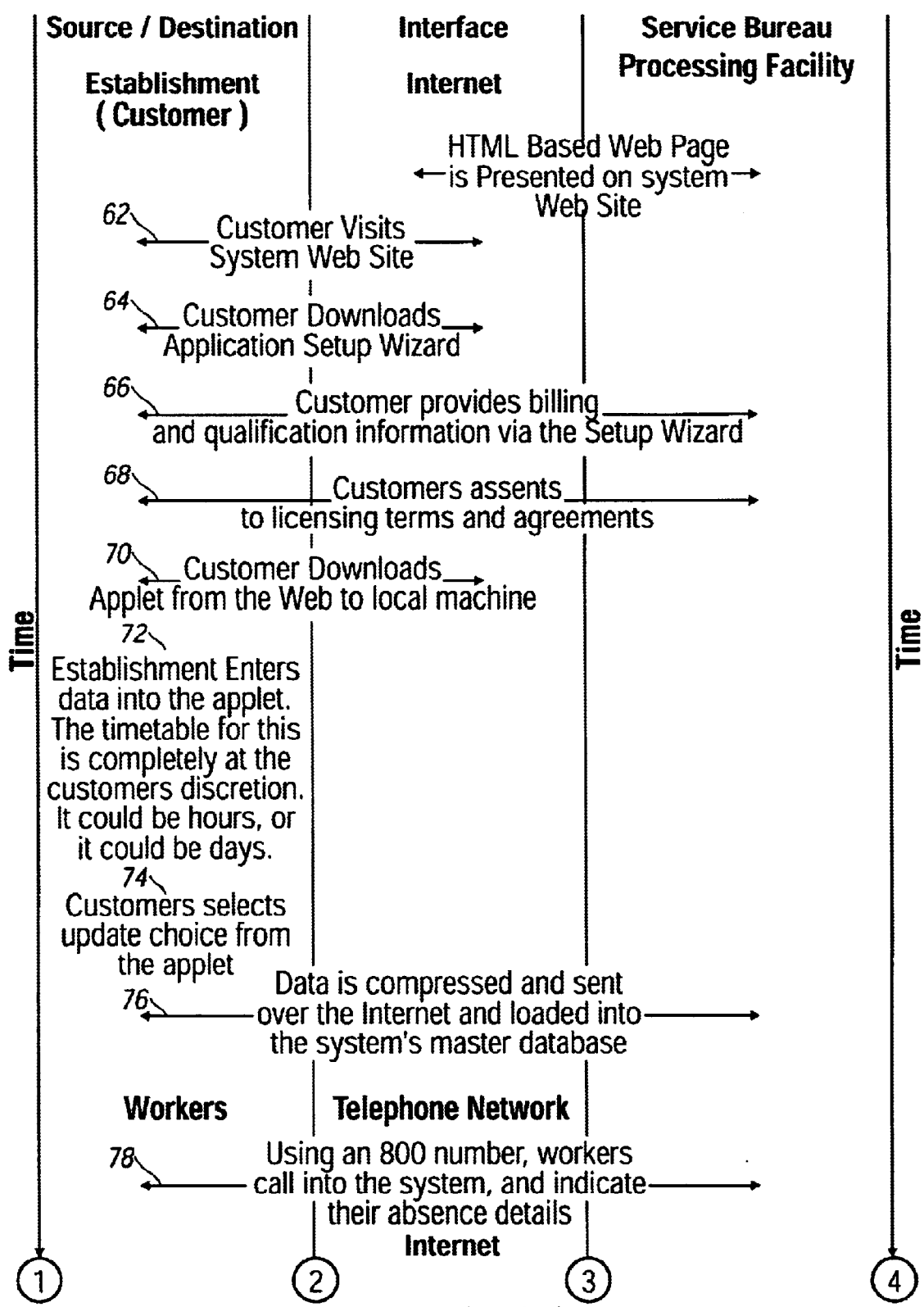
FIG. 2 is a data flow diagram showing the exchange of information between various entities involved in substitute fulfillment performed in accordance with a preferred embodiment of the present invention.

FIG. 2 illustrates the flow of information in a preferred embodiment of the present invention. Maintaining the database and performing substitute fulfillment, information compilation and notification requires a periodic exchange of information between a client organization and the system; FIG. 2 illustrates a series of these steps.

A client organization 56 is required to have a computer 54 with Internet access 12. The Internet access 12 is preferably through a direct connection, but may alternatively be through a dial-up connection. In a preferred embodiment of the present invention, a potential customer organization 56 initially accesses the system 10 through the client organization web site in step 62. In step 70, the potential customer organization 56 obtains a copy of an introductory software applet of the present invention by downloading it from the web site. Alternatively, the potential customer organization may receive a copy of the introductory software applet through a different medium, such as a CD-ROM.

Registering for the System

In a preferred embodiment of the present invention, in step 64, once the potential customer organization accesses the web site and requests the applet, the communications and processing server first sends the organization a registration "wizard." The wizard presents a series of interfaces to guide the organization through the registration process. Referring now to FIG. 11, preferably, the registration wizard interface 250 requires that the organization submit identification 260 and billing information 258, for use primarily if the organization 56 later decides to enroll as a client with the system 10. In subsequent step 68, the system 10 next presents and requires that the potential customer organization 56 agree to licensing terms. After the information is provided in step 66, subsequently, the system 10 allows the organization 56 to download the applet to its own computer 54 in step 70.

In a preferred embodiment, until the organization 56 registers as a client organization, the organization 56 is entitled only to a trial use of the system 10 and is able to access only limited functionality of the applet and the system 10. For example, the organization 56 may only be able to use the applet to perform for a limited number of workers 18. If the organization 56 has not registered as a customer organization within a certain period, for example, 30 days, the applet expires and the organization 56 must reinitiate the process.

In a preferred embodiment, the applet resides locally on the client's computer 54 and functions independently of the main server 30 for most of its functions; an Internet connection 12 need not be maintained to run the applet, nor need Internet communications software be open. The applet is primarily a data entry and reporting and Internet communications tool. Once the organization 56 has received the applet, in step 72, the organization must enter data to initialize the applet and the substitute fulfillment system 10 for its use.

Figure 3:
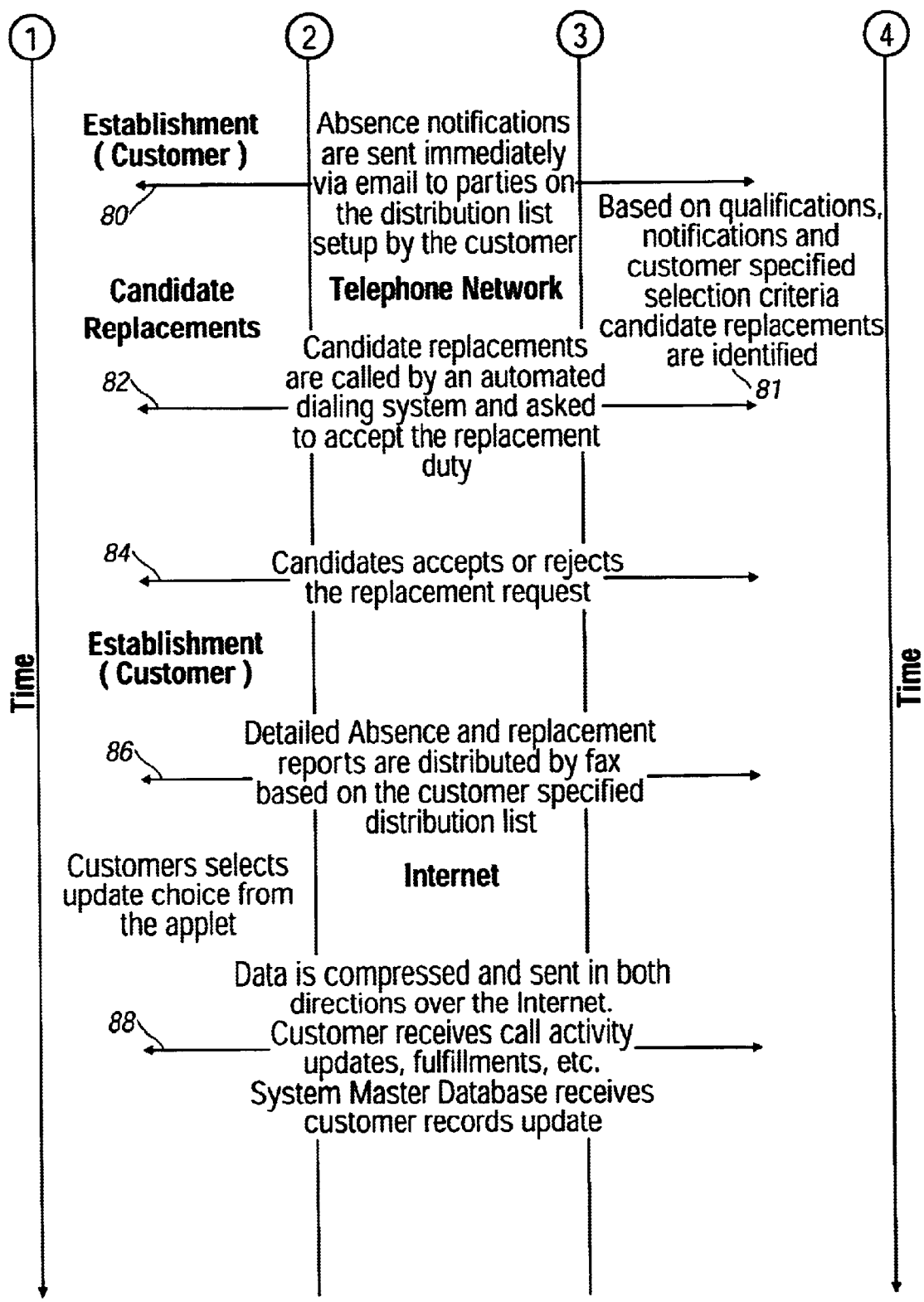
FIG. 3 is a diagram showing an exemplary data structure of a worker record stored in accordance with a preferred embodiment of the present invention.

In a preferred embodiment, the applet presents the client organization 56 with a series of forms to complete to build records which are key to substitute identification for each worker 18 or potential substitute 22, as well as other records necessary for ancillary tasks. Examples of other records include general customer information and reporting preferences. The applet is preferably tailored to collect data needed to perform substitute fulfillment in the work environment of the organization. For example, if the customer is a school, the applet may be tailored to collect data related to teachers, such as education background, certifications, schedules, and course information. The forms preferably conform to the data records that will be maintained by the communications and processing server 30 in the database 34. The applet may aid the client 56 in completing particular fields in the forms by providing drop-down lists with options for that field. There is shown in FIG. 5 a sample data structure 150 of a list of possible pick-lists that the applet may generate. For example, a drop-down list may provide a list of all courses taught at the school so that the client can select the classes taught by a particular teacher to fill in that teacher's record. The applet may also fill in certain fields for the client 56 automatically by drawing on information stored in other records. For example, referring to FIGS. 3 and 6, once a school has completed a school data record 166, the applet may fill in the school contact information 176, 178, and 180 for each teacher affiliated with a particular school.

When the initial data entry is complete, in step 74, the customer instructs the applet to transmit the data to the communications and processing server 30 to initialize the system 10. The applet communicates with the communications and processing server 30 via the Internet. During step 76, the server operates in and transitions between the following states shown in FIG. 13F: Wait (328), Import Object (329), Extract (330) and Send (331). The possible states of the client during step 76 include Extract (323), Send (324), Receive (325), Import (326) and Cleanup(327). The events used to invoke each of these states and to transition between the states are set forth in FIG. 13F.

The applet preferably transmits and receives data in compressed format. Subsequently, in step 88, the applet routinely transmits updates of data stored in servers 34, 36 to the communications and processing server 10 on a schedule determined by the client 56 in step 74 and also when expressly directed to do so by the client 56 in step 74.

Once the communications and processing server 30 has been initialized with an organization's information, the information can subsequently be updated using the applet. New information is entered in client's database using the applet. When the applet communicates with the communications and processing server 30, the communications and processing server 30 automatically determines what information has been added or changed in the client's database since the last session and updates the same information in the central database 34. Thus, all information entered into the applet resides on both the organization's computer 54 and in the substitute fulfillment database 34. Similarly, when the applet communicates with the communicating and processing server 30, the server 30 updates the applet regarding any activity that has occurred since the last communications session.

Typical Data Records in the System

FIGS. 3–10 illustrate a few types of data records that may be maintained and utilized in the database, particularly for a client that is a school. The data records provided illustrate what types of information the system 10 requires and how that information would typically be organized. In a preferred embodiment, the information in the data records is provided to the system 10 through the applet. Referring now to a preferred embodiment in FIG. 3, teacher and substitute information stored in a staff data record 90, or data record 404, may include: name 92; title 94; social security number 96; a personal identification number (PIN) 98; billing information for billing substitute fulfillment services involving that teacher 100; certifications of the teacher 102; a list of teachers preferred to substitute for the teacher, or, alternatively, a list of criteria for selecting an appropriate substitute for the teacher 104; schedule information, preferably through a pop-up calendar 106, including work duties and absence information 108 (primarily for teachers) and availability 126 (primarily for substitutes); flags for special conditions 122, such as special instructions for a substitute or messages from a teacher to a substitute; affiliation information 112; contact information for the teacher 116; organization contact information for who to contact if that teacher calls in an absence or a substitute fulfillment is performed 118; classroom location information 120; entitlement balances 124, for how many absences (sick days, personal days, etc.) a teacher has left for the school year; and call time preferences 128 (primarily for substitutes). The substitute schedule information is also stored in data record 403. The entitlement types are stored in data record 402. Referring now to FIG. 4, for record-keeping, billing, and administrative functions, the database may store a business data record 130 with fields such as: the billing address 132 of the customer organization, its mailing address 134, billing contact 136, emergency contacts 138, phone numbers 140, fax numbers 142, electronic mail addresses 144, and options selected 148. It is understood that the fields shown are only representative of the fields that may be used within the scope of the present invention. Also, these fields may be further broken down into more specific subfields, for example, multiple mailing addresses or different emergency contacts for different times of day, week, month, or year. In this way, the system 10 maintains the information needed to perform substitute fulfillment, information compilation or notification for a particular organization 56. Other possible records are shown in FIGS. 5–10, and include records for pick-list management 150; for school data 166; for county data 190; for district data 202; for client preferences 226; and for reporting schemes 230. The skills for each worker that may be used as a substitute or may require substitute are recorded in data record 409, while the worker's personal identification number for accessing the system 10 is stored in data record 410. Data records 407 and 408 include the preferred skills of a potential substitute and the skills of the actual substitute who accepts the position, respectively. The records maintained in the main database of the system 10 are preferably stored on the Oracle™ server 34.

Substitute Worker Fulfillment

Once the system 10 has been initialized, the system is ready to operate. No further specialized equipment need be set up at the local organization level. The substitute fulfillment operation is initiated when the system 10 identifies and schedules an absence in step 78. In the preferred embodiment of the present invention, the system may be notified of an absence in several ways in step 78. When a worker 18, 46 covered by the system 10 becomes aware of an absence, the worker 18, 46 may contact the communications and processing server 30 by telephone 48, preferably through a toll-free number. Using keys on the standard telephone keypad, the worker 18, 46 identifies himself and enters the details of his pending absence. The skills required of a substitute are stored in data record 405. Alternatively, the worker 18, 46 may contact the communications and processing server 30 via the Internet 26, possibly using a home-based computer 20, through a worker web site which is preferably secure. The information regarding the pending absence is stored in data record 401. In addition to providing information regarding his upcoming absence, the worker 18, 46 may also record or transmit a message directed to the substitute 20. In one embodiment, if the worker 18, 46 notifies the organization 56, rather than the system 10, of the absence directly, the organization 56 may simply update its applet and connect to the communications and processing server 30, which process will automatically update the communications and processing server database 34, notify the substitute fulfillment system 10 of the absence, and trigger the substitute fulfillment process.

In step 78, the worker calls into the system and indicates the pending absence(s) and the information is stored in data record 401. The entitlement information regarding a pending absence is stored in data record 406. The server operates in the states shown in FIG. 13A, including Initial(281), MainMenu (282), Whenstep1 (283), WhenAnotherDay (284), Shift (285), StartTime (286), AbsenceType (287), RecordInstructions (288) ConfirmAbsence (289), CheckComplete (290), Entitlements (291), ErrorState (292), Hangup (293), and Goodbye (294), and the events which invoke these states are also described in FIG. 13A. For example, Generate Start Event signifies returning to the first action of the phonecall, preferably to replay a greeting or a request for an identification number. MainMenu (282) prompts the worker to push 1 on the telephone if the worker desires to record an absence, 2 to listen to entitlement day balances, including but not limited to vacation, personal and sick days remaining, and 3 for special instructions regarding a particular workplace. In Shift (285), if the worker's absence will not begin at the start of the work shift, the system proceeds to StartTime (286), during which worker is prompted for the start time of the absence. The worker is prompted to designate an absence type, which types have been designated by the Client, in state 287. In Entitlements (291), "List Entitlement Day Balances" signifies notifying the worker of entitlements, including but not limited to, used and remaining vacation, sick and personal days.

In step 80, the system 10 distributes absence notifications to relevant client personnel 14, 50, preferably on a regular basis at a time specified in advance by the client 56. Referring now to FIG. 12, notifications may take the form of summary absence reports 276. The information for the absence reports is stored on data record 400. For example, the server 30 may transmit a summary absence report 276 for each workday at 5:00 p.m. on the previous day and again at 7:00 a.m. that day to selected client personnel. Summary absence reports 276 may be distributed by facsimile 52, electronic mail 16, or via the applet to any parties designated by the client 56 as "need-to-know" parties 14, 50 for all absences or for particular absences. Notification preferences are stored within the communications and processing server 30. In a preferred embodiment, designated client personnel 14, 50 receive both an absence notification via electronic mail 16 as soon as the absence is registered and a summary absence report 276 via facsimile 52 at a pre-set time. Use of multiple communications channels builds additional reliability into the system 10.

In step 81, the substitute fulfillment system 10 identifies potential replacements 22 for the absent worker 18, 46. The organization 56 typically has a pool of potential replacements 22 available to it. If the organization 56 has chosen to identify particular replacements 22 suitable for a particular worker 18, 46, then the substitute fulfillment system 10 may simply locate that list. Alternatively, if the organization 56 has identified only qualifications or criteria for selecting an acceptable replacement 22 for a particular worker 18, 46, then the substitute fulfillment system 10 may compile a list by searching for potential replacements with the requisite qualifications in a master list of replacements 22 available to the organization located in the database 34. In a preferred embodiment, the substitute fulfillment system 10 may compile a list of preferred replacements and a back-up list of acceptable replacements.

In step 82, the server 30 then contacts potential replacements 22, preferably via telephone 32, 40, 42 and 44, using interactive voice response technology (suitable equipment includes Dialogic™ Model D-41ESC and D-240 product line) that interfaces logically with callers, usually employing a set of pre-recorded prompts, a database, and dynamic selection criteria. The number called, and the caller identification are recorded in data record 411. The server operates during step 82 in the states including MakeTheCall (308), CallAnalysis (309), Identify (310), PresentRequest (311), RejectRequest (312), AcceptRequest (313), ErrorState (314), Hangup (315) and Goodbye (316), which are displayed in FIG. 13D. The invoking events for each of these states are set forth in FIG. 13D, and examples of these events follow: In Identify (310), the potential replacement is prompted for an identification number. In PresentRequest (311), the request is played and the potential replacement is prompted for 1 to replay the request, 2 to accept and 3 to reject. Further, the potential replacement is prompted for 1 to reject future requests, or 2 to allow additional requests to be phoned to the potential replacement, in RejectRequest (312). If the potential replacement accepts the request, a confirmation number is played in AcceptRequest (313).

The system 10 will call qualified replacements 22 over a period of time until one of the qualified replacements accepts the substitute assignment in step 84 or the list of potential replacements 22 is exhausted. If multiple lists of potential replacements have been compiled, the system 10 will first search the list of preferred replacements before resorting to secondary lists. The client organization 56 may specify appropriate call times and other parameters for the Interactive Voice Response technology.

If a substitute 22 accepts the assignment, the server 30 may relay instructions from the organization 56 or messages from the absent worker 18 to the substitute. Referring now to FIG. 12, the system 10 then generates summary absentee reports 276, summary substitute assignment reports 278, call history reports 279, and unfulfilled substitute assignment reports 280 with the details of any successful replacement, all calls made, and information regarding any vacancy that could not be filled. The information for said reports is stored in data record 400. In step 86, the server 30 distributes to organization personnel 14 designated for receipt of the reports. Clients 56 may specify different personnel distribution lists for various reports. Reports may be mailed electronically or faxed, or both by server 30.

Because the applet is updated each time the communications and processing server 30 is accessed, the applet will typically contain an accurate history of system use and may also be used for local reporting and review of historic substitute fulfillment system operation data. In a preferred embodiment of the present invention, all desired transaction information, including all absence notifications, substitute requirements, substitute fulfillment attempts, substitute fulfillment successes and failures, web site accesses, employment searches by substitutes, etc., are stored in the database 34.

List of Opportunities for Replacement Workers

In a preferred embodiment, using the information in the database 34, the server 30 may also generate a listing of opportunities for replacement workers 22 and make the listing available through a web site interface. Replacement workers 22 may access the site and select an assignment. If the same assignment is currently being processed or waiting to be processed by the system's (10) Interactive Voice Technology, then the assignment selection is recognized, further processing is halted, and appropriate reports generated. Data record 400 stores the information for said reports.

The server 30 is capable of handling multiple clients 56 and multiple substitute fulfillment tasks simultaneously. Because the system 10 is centralized, services multiple customers 56, and maintains a database 34, including historical system use information, the system 10 of the present invention provides special opportunities to match substitutes across organizations 56, to aggregate data and to review trends. In a preferred embodiment, the server 30 and database 34 track substitute fulfillment data globally, identify opportunities for inter-organization substitute referral or fulfillment, and report on substitute fulfillment needs and other trends. The report information is stored in data record 400. For example, the server 30 may identify substitute teachers registered in a district adjacent to a customer school district and inform the customer school district. In another example, the substitute fulfillment system may identify hot spots where substitutes with particular qualifications are in demand.

Notification System of an Unexpected Absence

In a preferred embodiment, the invention may be used to notify designated groups of people of an absence over the telephone. The client in this embodiment is an organization including but not limited to school or business entity. The data records may contain information related to contact information for each student in the school's body or each worker, including but not limited to, phone numbers and email addresses of parents' and guardian's, student's classes, and student's year. In step 78, the system 10 receives phone calls and emails regarding the absence. Information regarding the call, including the number called is stored at data record 411. In step 78, the server transitions between the states shown in FIG. 13C, which included RecordFilesMenu (303), RecordFiles (304), ErrorState (305), Goodbye (306) and Hangup (307). These states are invoked by the events set forth in FIG. 13C, and several example events follow. The caller is prompted for the recording ID, in order prevent an unauthorized recording in RecordFilesMenu (303). In RecordFiles (304), if caller presses 1 on the telephone, the system 10 prompts the caller to record a new recording or to verify that the existing recording is acceptable.

The system 10 distributes notifications of absence to interested parties, including but not limited to, administrators or managers. These notifications may be in the form of summary absence reports distributed by facsimile 52, electronic mail 16, or via telephone to any parties designated by the client 56 as a contact person for all absences or for particular absences, including absences for a particular class year.

In step 82, the server 30 may then contact the persons listed in the contact information ("contacts") for each absent student or worker, including but not limited to parents and guardians, preferably via telephone 32, 40, 42 and 44. The system 10 will call the contacts in order to receive an acknowledgement that the student or worker is absent for an acceptable reason. If the list of particular contacts for the student or worker is exhausted in step 86, the designated personnel in the organization receives a report of unacknowledged absences from the server 30.

Notification System of an Unexpected Event

In another preferred embodiment, the invention may be used to notify designated groups of people over the telephone of an unexpected event. The client in this embodiment includes but is not limited to a school, school district, or business entity. The data records, in a preferred embodiment, contain information related to contact information for each student or worker of the client's, including but not limited to, phone numbers for workers, parents, and guardians, email addresses, student's classes, student's grade, and the content of the message representing the unexpected event.

The system 10 receives a phone call or email regarding an unexpected event or announcement of the client, and records a new message regarding the unexpected event or announcement. The server then operates in and transitions between the states shown in FIG. 13B, which include MainMenu (295), RecordSchoolMenu (296), RecordSchool (297), Record EntTypesMenu (298), RecordEntTypes (299), ErrorState (300), Goodbye (301), and Hangup (302). The events which invoke and transition between these states are shown in FIG. 13B.

In step 82, the server 30 then contacts the persons listed in the contact information for each affected student or worker, including but not limited to parents and guardians, preferably via telephone 32, 40, 42 and 44, to notify the contacts of the event or announcement. If the list of potential contacts for the worker or student is exhausted, in step 86, the designated personnel in the entity or school receives a report of unacknowledged event announcements from the server 30.

The system 10 distributes notifications of the contacts. These notifications may be in the form of summary event reports distributed by facsimile 52, electronic mail 16, or via the applet to any parties designated by the client 56 as a contact person for all events or for particular events. All information for the reports is stored in data record 400.

System for Recording Daily Announcements

In another preferred embodiment, the invention may be used to notify designated groups of people over the telephone of daily announcements, including but not limited to school menus. The client in this embodiment is a school, school district, or business entity.

In this embodiment, the server operates in and transitions between the states shown in FIG. 13B, which include MainMenu (295), RecordSchoolMenu (296), RecordSchool (297), RecordEntTypesMenu (298), RecordEntTypes (299), ErrorState (300), Goodbye (301), and Hangup (302). The events which invoke and transition between these states are shown in FIG. 13B. For example, the system 10 prompts the caller in MainMenu (295) to enter 1 to reach the RecordSchoolMenu, in order to record an announcement and 2 to reach the RecordEntTypes Menu, in order to record a message regarding entitlement types. Information regarding entitlement types is stored in data record 402. In RecordSchoolMenu (296), the caller is prompted for the valid school recording identification, which prevents unauthorized recordings, and similarly in RecordEntTypesMenu 298, the caller is prompted for the valid Entitlement Type Recording ID, which prevents unauthorized recordings. In RecordSchool (297) and RecordEntTypes (299), if caller presses 1 on the telephone, the system 10 prompts the caller to record a new recording or to verify that the existing recording is acceptable.

Notification System of Patient-related Information

The invention, in another preferred embodiment, may be used to notify doctors of important patient related information, e.g., patient tests, and patient status. The system 10 receives phonecalls and emails regarding the patient related information. The system 10 distributes notifications of the information via voice recorded messages that are announced to many doctors at once using the contact data for the relevant doctors.

Substitute Teller Fulfillment System

In another preferred embodiment, the invention may be used to fulfill the substitute teller requirements in a retail bank. The client in this embodiment is a retail bank or branch office. The data records may contain information related to contact information for each substitute teller, including but not limited to, phone numbers, email addresses, and qualifications. The system 10 receives a phone call or email regarding an absence of a teller, and the information regarding this absence is stored in data record 401. In step 82, the server 30 then contacts the potential substitute tellers, preferably via telephone 32, 40, 42 and 44. During step 82, the server proceeds in and transitions between the states in FIG. 13D, which include MakeTheCall (308), CallAnalysis (309), Identity (310), Present Request (3110, RejectRequest (312), AcceptRequest (313), ErrorState (314), Hangup (315) and Goodbye (316). The events which invoke these states and transitions between the states are set forth in FIG. 13D. Provided the system was able to contact the substitute teller, the substitute teller is able to accept or reject the position.

Alternatively, the client may have a pool of floating tellers, who fill the vacancies in the bank in a given day. The server 30 then contacts the floating tellers, preferably by telephone, email, or facsimile to inform the floating teller to report to a particular branch office. If the server 30 attempts to contact the floating tellers via facsimile, the server 30 proceeds in and transitions between the states set forth in FIG. 13E. The possible states of the server include MakeTheCall (317), CallAnaylsis (318), FaxSend (319), ErrorState (320), Goodbye (321) and Hangup (322). FIG. 13E sets forth the events which trigger these states and the transitions between these states.

Upon acceptance by a substitute teller or floating teller or exhaustion of the list of substitute tellers or floating tellers, the system 10 generates reports detailing who is absent, who was contacted regarding the position, who has accepted the position and the qualifications of the substitute or floating teller. The information compiled in the reports is stored in data record 400.

Worker Substitute Fulfillment System

The invention, in another preferred embodiment, may be used to fulfill the substitute worker requirements for workers, including but not limited to, fire police, ambulance workers, waitstaff, cooks, bus boys, cashiers, sales people, production line workers, pilots and stewards. The data records may contain information related to contact information for each substitute worker, including but not limited to, phone numbers, email addresses, and qualifications, and the shifts worked by the workers. The system 10 receives a phonecall or email regarding an absence of a worker, and store this information in data record 401. In step 82, the server 30 then contacts the potential substitute workers, who are not working the specified shift, preferably via telephone 32, 40, 42 and 44. Provided the system was able to contact the substitute worker, the substitute worker is able to accept or reject the position. In step 82, the server 30 then contacts the potential substitute tellers, preferably via telephone 32, 40, 42 and 44. During step 82, the server proceeds in and transitions between the states in FIG. 13D, which include MakeTheCall (308), CallAnalysis (309), Identity (310), Present Request (3110, RejectRequest (312), AcceptRequest (313), ErrorState (314), Hangup (315) and Goodbye (316). The events which invoke these states and transitions between the states are set forth in FIG. 13D. Provided the system was able to contact the substitute worker, the substitute worker is able to accept or reject the position.

Temporary Worker Agency Fulfillment System

In another preferred embodiment, the invention may be used to fulfill the substitute worker requirements through a temporary worker agency. This embodiment of the invention may be used to find replacements for material moving and equipment operators, nurses, doctors, x-ray technicians, physical therapy workers, and surgical assistants. The client in this embodiment is a temporary worker agency. The data records may contain information related to contact information for each substitute worker, including but not limited to, phone numbers, email addresses, particular position sought and qualifications. The system 10 receives a phone call or email from a customer of the client designating the position to be filled, and the information is stored in data record 401. Additionally, the absent worker of the client's customer may directly contact the system 10 preferably via telephone or email.

In step 82, the server 30 then contacts the potential substitutes with the requisite qualifications, preferably via telephone 32, 40, 42 and 44. Provided the system was able to contact the substitute, the substitute is able to accept or reject the position. During step 82, the server proceeds in and transitions between the states in FIG. 13D, which include MakeTheCall (308), CallAnalysis (309), Identity (310), PresentRequest (3110, RejectRequest (312), AcceptRequest (313), ErrorState (314), Hangup (315) and Goodbye (316). The events which invoke these states and transitions between the states are set forth in FIG. 13D.

The system 10 generates reports detailing who is absent, who was contacted regarding the position, who has accepted the position and the qualifications of the substitute. According the client's instructions, these reports may be sent to the client and the client's customers. Reports may be customized to show the information required by each of the client's customers, said information in data record 400.

Notification System for Union Policies and Benefits

In another preferred embodiment, the invention may be used to notify union members of policies and benefits. The client is a union or unionized organization. The data records may contain information related to contact information for each member, including but not limited to, phone numbers, email addresses, position and employer. The system 10 receives a phone call or email from the client designating new policies or benefits for union members, or business matters for the union. In step 82, the server 30 then contacts the members who are affected by the policies, benefits or business matters, preferably via telephone 32, 40, 42 and 44. The system 10 generates reports detailing who was successfully and unsuccessfully contacted.

System for Recording Absences and Entitlements

In another preferred embodiment, the invention may be used to record absences for a business entity. The client is a business entity, such as a corporation. The data records may contain information related to contact information for each worker, including but not limited to, phone numbers, email addresses, position and entitled vacation, sick and personal time. The system 10 receives a phone call or email from a worker designating an absence and reason for the absence, including but not limited to sick time, vacation time and personal time, and stores the information in data record 401. The system 10 generates reports from data record 400 detailing who is absent, and the absent worker's record for absences including the type of absence. These reports may include sick time, vacation time and personal time used and remaining.

System for Idle Temporary Worker Auctions

In another preferred embodiment, the invention may be used to allow different clients to bid for temporary workers. The client would designate the required skills and pertinent information for the temporary worker, e.g., the required degrees, the required experience, the geographical location of the position and the dates of the position. Additionally, the client would designate how much it was willing to pay for the temporary worker. The system 10 then processes all requests for temporary workers for the date and time required and fulfills the requests based upon the highest bidder receiving the most qualified temporary worker for the position first, then the next highest bidders request is fulfilled and so on until all requests are fulfilled or no acceptable temporary workers are available.

System Back-ups

In a preferred embodiment, the system 10 has at least one offsite operational backup site. The communications and processing server and related equipment may also be supplied with a fossil-fuel powered generator for a back-up power supply.

If not otherwise stated herein, it may be assumed that all components, modes of communication, and/or processes described heretofore may, if appropriate, be considered to be interchangeable with similar components, modes of communication, and/or processes disclosed elsewhere in the specification, unless an express indication is made to the contrary.

Although the invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. A computer-implemented substitute fulfillment system that identifies and secures substitute workers for a plurality of different organizations, comprising:

a central server that processes information associated with a plurality of different organizations;

a central database coupled to the central server, the central database including records that store substitute fulfillment data associated with each of the plurality of different organizations, wherein for each of the different organizations the fulfillment data includes worker records representing workers that may be absent from the organization and substitute worker records representing substitute workers that may be used to fill a position of an absent worker;

a plurality of local processors that are remote from the central server, each of the local processors being associated with one of the different organizations and having a separate local database coupled thereto, wherein each local database is associated with one of the different organizations and includes worker records representing workers that may be absent from the organization and substitute worker records representing substitute workers that may be used to fill a position of an absent worker;

wherein said organizations comprise one or more of schools, school districts, retail banks, branch offices of banks, convenience stores, manufacturing facilities, fire departments, police departments, hospitals, transportation departments, airlines and temporary worker agencies;

wherein the central database maintains each of the records on each local database in parallel with a corresponding record on the central database by periodically updating the records on the local databases in response to data changes on the central database, and wherein each local database maintains records on the central database in parallel with corresponding records on the local database by periodically updating the records on the central database in response to the data changes on the local database;

at least one telephone communication link coupled to the central server, wherein the telephone communication link provides information representing absent workers to the central server, the central server identifies one or more of the substitute workers in response to the information representing absent workers, and the central server communicates information representing positions to be filled to substitute workers via the telephone communication link or an Internet communication link and secures one or more substitute workers via the telephone communication link or the Internet link; and wherein the central server periodically transmits reports that include absentee and substitute information to each of the different organizations via the telephone communication link or the Internet communication link.

2. A computer-implemented substitute fulfillment system that identifies and secures substitute workers for a plurality of different organizations, comprising:

a central server that processes information associated with a plurality of different organizations;

a central database coupled to the central server, the central database including records that store substitute fulfillment data associated with each of the plurality of different organizations, wherein for each of the different organizations the fulfillment data includes worker records representing workers that may be absent from the organization and floating worker records representing substitute workers that may be used to fill a position of an absent worker;

a plurality of local processors that are remote from the central server, each of the local processors being associated with one of the different organizations and having a separate local database coupled thereto, wherein each local database is associated with one of the different organizations and includes worker records representing workers that may be absent from the organization and floating worker records representing floating workers that may be used to fill a position of an absent worker;

wherein the central database maintains each of the records on each local database in parallel with a corresponding record on the central database by periodically updating the records on the local databases in response to data changes on the central database, and wherein each local database maintains records on the central database in parallel with corresponding records on the local database by periodically updating the records on the central database in response to the data changes on the local database;

at least one telephone communication link coupled to the central server, wherein the telephone communication link provides information representing absent workers to the central server, the central server identifies one or more of the floating workers in response to the information representing absent workers, and the central server communicates information representing positions to be filled to floating workers via the telephone communication link or an Internet communication link and secures one or more substitute workers via the telephone communication link or the Internet link; and wherein the central server periodically transmits reports that include absentee and substitute information to each of the different organizations via the telephone communication link or the Internet communication link.

3. A method for performing substitute fulfillment for a plurality of different organizations comprising:

receiving absentee information representing an absent worker via at least one communication link;

generating and posting a list of one or more positions of one or more absent workers that need to be filled by one or more substitute workers on a website;

receiving a response by a substitute worker selecting a posted position on the website via an Internet communication link; and securing via the Internet communication link the substitute worker who selected the posted position to fill in for the absent worker.

4. The method of claim 3 wherein the one or more absent workers are from a plurality of different organizations.

5. The method of claim 3 wherein the posted list of one or more positions includes positions from a plurality of different organizations.

6. A substitute fulfillment system that secures one or more substitute workers for a plurality of organizations comprising:

a database comprising worker records, said worker records having information associated with workers for each of the organizations, and substitute records, said substitute records having information associated with at least one substitute worker; and a server connected to the database, the server configured for:

receiving absentee information representing an absent worker via at least one communication link;

generating and posting a list of one or more positions of one or more absent workers that need to be filled by one or more substitute workers on a website;

receiving a response by a substitute worker selecting a posted position on the website via an Internet communication link; and securing via the Internet communication link the substitute worker who selected the posted position to fill in for the absent worker.

7. The substitute fulfillment system of claim 6 wherein the server is further configured to generate a list of substitute workers and absent workers who the substitute workers will be filling in for a given organization and to transmit the generated list of substitute workers and names of the absent workers who the substitute workers will be filling in for to the given organization via the at least one communication link.

8. The substitute fulfillment system of claim 6 wherein the server is further configured to receive a message via the at least one communication link and to forward the received message to the substitute worker who agrees to fill in for the absent worker via the at least one communication link.

9. The substitute fulfillment system of claim 6 wherein each worker record comprises worker identification, contact, position, qualification, and substitute selection information.

10. The substitute fulfillment system of claim 9 wherein each worker record further comprises entitlement information and historical information of absences and substitute fulfillment events.

11. The substitute fulfillment system of claim 6 wherein each substitute worker record comprises substitute identification, contact, qualification, and availability information.

12. The substitute fulfillment system of claim 6 wherein the organizations are unaffiliated.

13. The substitute fulfillment system of claim 6 wherein the workers are teachers and the substitute workers are substitute teachers.

* * * * *

UNITED STATES PATENT AND TRADEMARK OFFICE
CERTIFICATE OF CORRECTION

| | | |
|---|---|---|
| PATENT NO. | : 6,675,151 C1 | Page 1 of 1 |
| APPLICATION NO. | : 90/008803 | |
| DATED | : October 20, 2009 | |
| INVENTOR(S) | : Roland R. Thompson et al. | |

It is certified that error appears in the above-identified patent and that said Letters Patent is hereby corrected as shown below:

IN THE CLAIMS

Col. 1, Claim 3, line 45, delete "form" and replace with --from--.

Col. 3, Claim 19, line 1, delete "era" and replace with --of a--.

Col. 4, Claim 35, line 57, delete "Offer" and replace with --offer--.

Signed and Sealed this

Twenty-fourth Day of August, 2010

David J. Kappos
*Director of the United States Patent and Trademark Office*

(12) EX PARTE REEXAMINATION CERTIFICATE (7116th)
United States Patent
Thompson et al.

(10) Number: US 6,675,151 C1
(45) Certificate Issued: *Oct. 20, 2009

(54) SYSTEM AND METHOD FOR PERFORMING SUBSTITUTE FULFILLMENT INFORMATION COMPILATION AND NOTIFICATION

(75) Inventors: Roland R. Thompson, Malvern, PA (US); Michael S. Blackstone, Downingtown, PA (US)

(73) Assignee: Frontline Placement Technologies, Inc., Elverson, PA (US)

Reexamination Request:
No. 90/008,803, Aug. 9, 2007

Reexamination Certificate for:
Patent No.: 6,675,151
Issued: Jan. 6, 2004
Appl. No.: 09/419,266
Filed: Oct. 15, 1999

(*) Notice: This patent is subject to a terminal disclaimer.

Related U.S. Application Data

(63) Continuation-in-part of application No. 09/217,116, filed on Dec. 21, 1998, now Pat. No. 6,334,133.

(51) Int. Cl.
*G06Q 10/00* (2006.01)

(52) U.S. Cl. .................................................. 705/9
(58) Field of Classification Search ................... None
See application file for complete search history.

(56) References Cited

U.S. PATENT DOCUMENTS

| | | | |
|---|---|---|---|
| 5,117,353 A | 5/1992 | Stipanovich et al. |
| 5,592,375 A | 1/1997 | Salmon et al. |
| 5,862,223 A | 1/1999 | Walker et al. |
| 5,978,768 A | 11/1999 | McGovern et al. |
| 6,038,597 A | 3/2000 | Van Wyngarden |
| 6,061,506 A | 5/2000 | Wollaston et al. |
| 6,064,977 A | 5/2000 | Haverstock et al. |
| 6,192,346 B1 | 2/2001 | Green |
| 6,253,188 B1 | 6/2001 | Witek et al. |
| 6,266,659 B1 | 7/2001 | Nadkarni |
| 6,275,812 B1 | 8/2001 | Haq et al. |
| 6,301,574 B1 | 10/2001 | Thomas et al. |
| 6,311,192 B1 | 10/2001 | Rosenthal et al. |
| 6,334,133 B1 | 12/2001 | Thompson et al. |
| 6,370,510 B1 | 4/2002 | McGovern et al. |
| 6,381,592 B1 | 4/2002 | Reuning |
| 6,381,640 B1 | 4/2002 | Beck et al. |
| 6,385,620 B1 | 5/2002 | Kurzius et al. |
| 6,408,337 B1 | 6/2002 | Dietz et al. |

(Continued)

OTHER PUBLICATIONS

Daly, Lesley. "Substitute Teacher Shortage Hits Schools," Apr. 24, 1998 [retrieved from the Internet]. 3 Sheets.

(Continued)

*Primary Examiner*—Fred Ferris

(57) ABSTRACT

A system and method for automating the performance of substitute fulfillment to assign a replacement worker to substitute for a worker during a temporary absence, performing placement of floating workers, tracking absences and entitlements of workers, notifying interested parties regarding unexpected events and daily announcements, and bidding for temporary workers. Substitute fulfillment, contact, absence, entitlement and notification data is stored centrally in a database on a server at a common site for multiple organizations employing the substitute fulfillment or notification system. When a worker absence is indicated, the system searches the database to obtain a list of potential replacements for the absent worker and tracks the worker's absences and entitlements. The system contacts potential replacements until one is found or until the list is exhausted. The system generates suitable reports and notifies organization personnel of any activity. The system also records announcements regarding unexpected or current events and contacts the interested parties of an organization with these announcements. The system stores and aggregates historical operation data, prepares reports and provides relevant services.

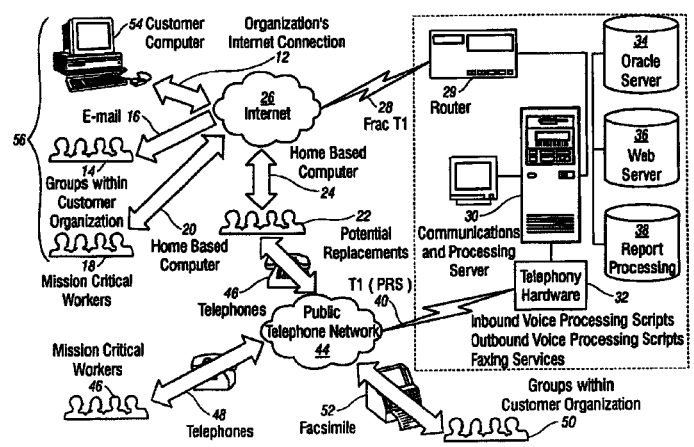

U.S. PATENT DOCUMENTS

| | | | |
|---|---|---|---|
| 6,415,259 | B1 | 7/2002 | Wolfinger et al. |
| 6,457,005 | B1 | 9/2002 | Torrey |
| 6,466,914 | B2 | 10/2002 | Mitsuoka et al. |
| 6,524,109 | B1 | 2/2003 | Lacy et al. |
| 6,564,188 | B2 | 5/2003 | Hartman et al. |
| 6,567,784 | B2 | 5/2003 | Bukow |
| 6,587,822 | B2 | 7/2003 | Brown et al. |
| 6,662,194 | B1 | 12/2003 | Joao |
| 6,675,151 | B1 | 1/2004 | Thompson et al. |
| 6,735,570 | B1 | 5/2004 | Lacy et al. |
| 6,873,964 | B1 | 3/2005 | Williams et al. |
| 2005/0010467 | A1 | 1/2005 | Dietz et al. |

OTHER PUBLICATIONS

King, Kristen, EBR Schools Install System to Track Substitute Teachers, Advocate, Baton Rouge, La, Apr. 27, 1998, 2 Sheets.

Subs are needed! Fast!; Computer Software Innovations, Inc., May 21, 1999, 1 Sheet.

Work, Deborah, In a Class by Itself Revolutionary Computer Finds Substitute Teachers—Sometimes More Than Needed, Sun Sentinal, Fort Lauderdale, Apr. 1, 1991, 2 Sheets.

Technology White Paper The Implementation of Distributed Time and Attendance Systems over Corporate Intranets and the Internet / WWW, copyrighted 1997, http://web.archive.org/web/19980201062006/f~tech.com/webtime.htm.

Aspect Telecommunications Announced Plans To Offer World Wide Web Solutions For Call Centers; New Web Interaction Capabilities For Agility Will Transform Call Centers Into Even More Powerful Customer Information Transaction Centers, Business Wire, Sep. 19, 1995, http://thefreelibrary.com/_/print/PrintArticle.aspx?Id=17436173, 3 Sheets.

TALX Corporation Releases TALXWare 8.1 Featuring State-of-the-Art Enhancements for Interactive Web and Interactive Voice Response, Business Wire, Aug. 27, 1997, http://www.thefreelibrary.com/_/print/PrintArticle.aspx?id=19701564, 2 Sheets.

Web-On-Call Voice Browser Redefines Access To The Web; Organizations Can Now Extend Their Reach Beyond The Net, Business Wire, Mar. 4, 1996, http://www.thefreelibrary.com/_/print/PrintArticle.aspx?id=18052502, 2 Sheets.

US 6,675,151 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 6 and 9 are determined to be patentable as amended.

Claims 4–5, 7, 8 and 10–13, dependent on an amended claim, are determined to be patentable.

New claims 14–55 are added and determined to be patentable.

Claims 1 and 2 were not reexamined.

3. A method for performing substitute fulfillment for a plurality of different organizations comprising:

receiving absentee information representing an absent worker *that will be or is physically absent from an organization worksite* via at least one communication link;

generating and posting *by one or more computers* a list of one or more positions of one or more absent workers that need to be filled by one or more substitute workers on a website *and providing, for one or more of the positions, information indicating directly or indirectly an organization worksite location for the respective position*;

receiving a response [by] *comprising an acceptance, by the one or more computers, from* a substitute worker selecting a posted position on the website via an Internet communication link; and securing, *in response to receiving the acceptance form the substitute worker,* via the Internet communication link *and the one or more computers, the posted position for* the substitute worker who selected the posted position to fill in for the absent worker, *the securing comprising halting, at the one or more computers, further processing to fulfill the posted position with any other substitute worker.*

6. A substitute fulfillment system that secures one or more substitute workers for a plurality of organizations comprising:

a database comprising worker records, said worker records having information associated with workers for each of the organizations, and substitute records, said substitute records having information associated with at least one substitute worker; and

*one or more computers comprising* a server connected to the database, the server configured for:

receiving absentee information representing an absent worker *that will be or is physically absent from an organization worksite* via at least one communication link;

generating and posting a list of one or more positions of one or more absent workers that need to be filled by one or more substitute workers on a website *and providing, for one or more of the positions, information indicating directly or indirectly an organization worksite location for the respective position*;

receiving a response [by] *comprising an acceptance from* a substitute worker selecting a posted position on the website via an Internet communication link; and securing, *in response to receiving the acceptance from the substitute worker,* via the Internet communication link *and the one or more computers, the posted position for* the substitute worker who selected the posted position to fill in for the absent worker, *the securing comprising halting, at the one or more computers, further processing to fulfill the posted position with any other substitute worker.*

9. The substitute fulfillment system of claim 6 wherein each *of a plurality of* worker [record] *records* comprises worker identification, contact, position, qualification, and [substitute selection information] *an identification of one or more preferred substitute workers to fill the position.*

*14. The method of claim 3,*
*wherein the list generated and posted comprises a plurality of positions that need to be filled, and further comprising:*
*generating or obtaining, for each respective one of a plurality of the positions that need to be filled, a respective electronic list of one or more preferred substitutes, before the posting step, and using the one or more lists of preferred substitutes to offer the one or more positions on the website.*

*15. The method of claim 14, further comprising:*
*creating, for each respective one of one or more of the positions that need to be filled, a respective electronic backup list of one or more substitute workers, and using the one or more backup lists to offer the one or more positions on the website.*

*16. The method of claim 3,*
*wherein the receiving an acceptance by a substitute worker comprises receiving electronically the acceptance by the substitute worker from the website on which the list of one or more positions was posted; and*
*wherein the securing step comprises generating by the one or more computers information that the position was secured to the substitute worker and sending or posting this information via the Internet communication link to the substitute worker.*

*17. The method of claim 3, wherein the securing step comprises generating by the one or more computers information that the position was secured to the substitute worker and sending or posting this information via the Internet communication link to the substitute worker and to an organization associated with the position.*

*18. The method of claim 3, further comprising:*
*facilitating provision of a worker web page that a worker may access with a respective personal identifier and capable of receiving details of a future absence of the respective worker for a position of an organization.*

*19. The method of claim 3, further comprising:*
*obtaining for each of a plurality of positions of an organization, one or more criteria for selecting a substitute worker to fill in at the respective position;*
*facilitating provision of a worker web page that a respective worker may access with a respective personal iden-* tifier and capable of receiving details era future absence of the respective worker from one of the positions;

receiving electronically, on the worker web page, details of a future absence of one of the respective workers from one of the plurality of positions; and selecting, by one or more computers, based at least in part on the one or more criteria for the respective position, one or more one substitute workers to which to communicate electronically an offer to fill in at the one position.

20. The method of claim 19, wherein one or more details of a respective future absence is received electronically for each of a plurality of respective positions of a plurality of organizations.

21. The method of claim 19, further comprising:

generating or obtaining a list of one or more preferred substitutes for the posted position;

calling via a telephone communication link automatically by the one or more computers one or more of the substitute workers on the list of one or more preferred substitutes;

communicating, by the one or more computers, with a called one of the substitute workers on the list by the telephone communication link to fulfill the posted position; and wherein the securing step, by the one or more computers, comprises halting further processing to fulfill the posted position with the called one of the substitute workers.

22. The method of claim 21, further comprising:

storing in an electronic database information about telephone calls to the one or more computers of a substitute fulfillment system from workers and substitute workers and website accesses to the substitute fulfillment system from workers and substitute workers.

23. The method of claim 3, further comprising:

generating or obtaining a list of one or more preferred substitutes for the posted position;

calling via a telephone communication link automatically by the one or more computers one or more of the substitute workers on the list of one or more preferred substitutes;

communicating, by the one or more computers, with a called one of the substitute workers on the list by the telephone communication link to fulfill the posted position; and wherein the securing step, by the one or more computers, comprises halting further processing to fulfill the posted position with the called one of the substitute workers.

24. The method of claim 3, wherein the information provided comprises information on a start time for an absence of the absent worker.

25. The method of claim 24, wherein the location information comprises classroom location information.

26. The method of claim 3, wherein the information provided further comprises shift and start time information.

27. The method of claim 3, further comprising identifying by one or more computers organization worksites where substitute workers with particular qualifications are in demand.

28. The method of claim 3, further comprising:

wherein the receiving absentee information step comprises receiving by one or more computers from a worker information about a future absence; and triggering by one or more computers the generating and posting step in direct response to receiving from the absent worker the future absence information.

29. The method of claim 3, further comprising:

maintaining by one or more computers an electronic main database comprising worker records, said worker records having information associated with workers for each of the organizations, and substitute records, said substitute records having information associated with a plurality of substitute workers, and information indicating directly or indirectly an organization worksite location for each of the workers;

receiving by one or more computers new information about a worker absence from an organization database of an organization associated with the position;

updating automatically by one or more computers the main database with the new information about the worker absence; and triggering by one or more computers the generating and posting step in direct response to receiving the new information from the organization database.

30. The method of claim 23, further comprising:

generating update information relating to a position and causing transmission of the update information to an organization database of an organization associated with the position.

31. The method of claim 23, further comprising:

sending, by the one or more computer, information derived from the future absence information via one or more communication links to notify one or more selected personnel of an organization associated with the position of the worker.

32. The method of claim 3, wherein the receiving step, by computer, comprises receiving an acceptance from one of the substitute workers by a telephone communication link.

33. The method of claim 3, wherein the receiving step, by computer, comprises receiving an acceptance from one of the substitute workers by a web communication link.

34. The system of claim 6, wherein the list generated and posted comprises a plurality of positions that need to be filled, and further comprising:

the one or more computers configured for generating or obtaining, for each respective one of a plurality of the positions that need to be filled, a respective electronic list of one or more preferred substitutes before the posting operation, and using the one or more lists of preferred substitutes to offer the one or more positions on the website.

35. The system of claim 34, further comprising:

the one or more computers configured for creating, for each respective one of one or more of the positions that need to be filled, a respective electronic backup list of one or more substitute workers, and using the one or more backup lists to Offer the one or more positions on the website.

36. The system of claim 6, further comprising:

the one or more computers configured for receiving an acceptance by a substitute worker from the website on which the list of one or more positions was posted; and the one or more computers configured for generating information that the position was secured to the substitute worker and sending or posting this information via the Internet communication link to the substitute worker.

37. The system of claim 6, further comprising:

the one or more computers configured for generating information that the position was secured to the substitute worker and sending or posting this information via the Internet communication link to the substitute worker and to an organization associated with the position.

38. The system of claim 6, further comprising:

the one or more computers configured for facilitating provision of a worker web page that a worker may access with a respective personal identifier and capable of receiving details of a future absence of the respective worker for a position of an organization.

39. The system of claim 6, further comprising:

the one or more computers configured for obtaining for each of a plurality of positions of an organization, one or more criteria for selecting a substitute worker to fill in at the respective position;

the one or more computers configured for facilitating provision of a worker web page that a respective worker may access with a respective personal identifier and capable of receiving details of a future absence of the respective worker from one of the positions;

the one or more computers configured for receiving electronically, on the worker web page, details of a future absence of one of the respective workers from one of the plurality of positions; and the one or more computers configured for selecting, based at least in part on the one or more criteria for the respective position, one or more substitute workers to which to communicate electronically an offer to fill in at the one position.

40. The system of claim 39, wherein one or more details of a respective future absence is received electronically for each of a plurality of respective positions of a plurality of organizations.

41. The system of claim 39, further comprising:

the one or more computers configured for generating or obtaining a list of one or more preferred substitutes for the posted position;

the one or more computers configured for calling via a telephone communication link automatically one or more of the substitute workers on the list of one or more preferred substitutes;

the one or more computers configured for communicating with a called one of the substitute workers on the list by the telephone communication link to fulfill the posted position; and the one or more computers configured for securing by halting further processing to fulfill the posted position with the called one of the substitute workers.

42. The system of claim 41, further comprising:

the one or more computers configured for storing in an electronic database information about telephone calls to the one or more computers of the substitute fulfillment system from workers and substitute workers and website accesses to the substitute fulfillment system from workers and substitute workers.

43. The system of claim 6, further comprising:

the one or more computers configured for generating or obtaining a list of one or more preferred substitutes for the posted position;

the one or more computers configured for calling via a telephone communication link automatically one or more of the substitute workers on the list of one or more preferred substitutes;

the one or more computers configured for communicating, with a called one of the substitute workers by the telephone communication link to fulfill the posted position; and the one or more computers configured for securing by halting further processing to fulfill the posted position with the called one of the substitute workers.

44. The system of claim 6, wherein the information provided comprises information on a start time for an absence of the absent worker.

45. The system of claim 44, wherein the location information comprises classroom location information.

46. The system of claim 6, wherein the information provided further comprises shift and start time information.

47. The system of claim 6, further comprising the one or more computers configured for identifying organization worksites where substitute workers with particular qualifications are in demand.

48. The system of claim 6, further comprising:

the one or more computers configured for receiving from a worker information about a future absence; and the one or more computers configured for triggering the generating and posting operation in direct response to receiving from the absent worker the future absence information.

49. The system of claim 6, wherein the database for the substitute fulfillment system comprises a main database, and further comprising:

the one or more computers configured for receiving new information about a worker absence from an organization database of an organization associated with the position;

the one or more computers configured for updating automatically the main database with the new information about the worker absence; and the one or more computers configured for triggering the generating and posting operation in direct response to receiving the new information from the organization database.

50. The system of claim 43, further comprising:

the one or more computers configured for generating update information relating to a position and causing transmission of the update information to an organization database of an organization associated with the position.

51. The system of claim 43, further comprising:

the one or more computers configured for sending information derived from the future absence information via one or more electronic communication links to notify one or more selected personnel of an organization associated with the position of the worker.

52. The system of claim 6, wherein the one or more computers are configured for receiving an acceptance from one of the substitute workers by a telephone communication link.

53. The system of claim 6, wherein the one or more computers are configured for receiving an acceptance from one of the substitute workers by a web communication link.

54. The system of claim 43, further comprising:

the one or more computers configured for playing a confirmation number over the telephone communication link to the substitute worker that has accepted the position.

55. The method of claim 23, playing a confirmation number by the one or more computers over the telephone communication link to the substitute worker that has accepted the position.

* * * * *

(12) POST-GRANT REVIEW CERTIFICATE (16th)
United States Patent
Thompson et al.

(10) Number: US 6,675,151 J1
(45) Certificate Issued: Apr. 21, 2016

(54) SYSTEM AND METHOD FOR PERFORMING SUBSTITUTE FULFILLMENT INFORMATION COMPILATION AND NOTIFICATION

(75) Inventors: Roland R. Thompson; Michael S. Blackstone

(73) Assignee: Frontline Technologies Group LLC

Trial Number:

CBM2012-00005 filed Sep. 16, 2012

Petitioner: CRS Advanced Technologies, Inc.

Patent Owner: Frontline Technologies, Inc.

Post-Grant Review Certificate for:

Patent No.: 6,675,151
Issued: Jan. 6, 2004
Appl. No.: 09/419,266
Filed: Oct. 15, 1999

The results of CBM2012-00005 are reflected in this post-grant review certificate under 35 U.S.C. 328(b).

POST-GRANT REVIEW CERTIFICATE
U.S. Patent 6,675,151 J1
Trial No. CBM2012-00005
Certificate Issued Apr. 21, 2016

AS A RESULT OF THE POST-GRANT REVIEW PROCEEDING, IT HAS BEEN DETERMINED THAT:

Claims 3, 6, 7, 16, 24 and 33 are cancelled.

\* \* \* \* \*